United States Patent
Elshafie et al.

(10) Patent No.: US 12,507,195 B2
(45) Date of Patent: Dec. 23, 2025

(54) AIDED AMBIENT INTERNET OF THINGS

(71) Applicant: QUALCOMM Incorporated, San Diego, CA (US)

(72) Inventors: Ahmed Elshafie, San Diego, CA (US); Marwen Zorgui, San Diego, CA (US); Mohammed Ali Mohammed Hirzallah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 18/360,068

(22) Filed: Jul. 27, 2023

(65) Prior Publication Data

US 2025/0039821 A1 Jan. 30, 2025

(51) Int. Cl.
*H04L 1/00* (2006.01)
*H04W 64/00* (2009.01)

(52) U.S. Cl.
CPC .................. *H04W 64/00* (2013.01)

(58) Field of Classification Search
CPC ............ H04W 64/00; H04W 84/18
USPC ..................................... 455/456.1
See application file for complete search history.

(56) References Cited

U.S. PATENT DOCUMENTS

2011/0085525 A1* 4/2011 Patini ............ H04L 67/12
370/338
2018/0295598 A1* 10/2018 Donnellan ........... G01S 5/012

OTHER PUBLICATIONS

3rd Generation Partnership Project; Technical Specification Group Services and System Aspects; Study on Ambient power-enabled Internet of Things (Release 19)H, 3GPP Standard, Technical Report, 3GPP TR 22.840, 3rd Generation Partnership Project, Mobile Competence Centre, 650, Route Des Lucioles, F-06921, Sophia-Antipolis Cedex, France, No. V1.2.0 Jun. 23, 2023, pp. 1-121, XP052409101, p. 8, Introduction.
CATT: "Study of Ambient IoT", RWS-230380, 3rd Generation Partnership Project, Mobile Competence Centre, 650, Route Des Lucioles, F-06921, Sophia-Antipolis Cedex, France, vol. TSG RAN, No. Taipei, Jun. 15, 2023-Jun. 16, 2023, Jun. 11, 2023, 9 Pages, XP052510117, p. 8, section 5 p. 8, section 6.
International Search Report and Written Opinion—PCT/US2024/035960—ISA/EPO—Oct. 17, 2024.

* cited by examiner

*Primary Examiner* — Tanmay K Shah
(74) *Attorney, Agent, or Firm* — QUALCOMM Incorporated

(57) ABSTRACT

A method for aided ambient Internet-of-Things signaling includes: obtaining, at the first network entity, one or more ambient device signal configuration characteristics for the ambient device; obtaining, at the first network entity, one or more sensing/positioning signal configuration characteristics; and transmitting, from the first network entity to one or more UE/RAN nodes (user equipment/radio access network nodes), a combined ambient and sensing/positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

24 Claims, 12 Drawing Sheets

AIDED AMBIENT INTERNET OF THINGS

BACKGROUND

Wireless communication systems have developed through various generations, including a first-generation analog wireless phone service (1G), a second-generation (2G) digital wireless phone service (including interim 2.5G and 2.7 5G networks), a third-generation (3G) high speed data, Internet-capable wireless service, a fourth-generation (4G) service (e.g., Long Term Evolution (LTE) or WiMax®), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Ambient Internet of Things devices have been introduced to measure and report environmental characteristics. Ambient Internet of Things devices may passively, semi-passively, or actively add information to received signals to provide backscattered signals including the added information.

SUMMARY

An example first network entity includes: one or more transceivers; one or more memories; and one or more processors, communicatively coupled to the one or more transceivers and the one or more memories, configured to: obtain one or more ambient device signal configuration characteristics for the ambient device; obtain one or more sensing/positioning signal configuration characteristics; and transmit, via the one or more transceivers to one or more UE/RAN nodes (user equipment/radio access network nodes), a combined ambient and sensing/positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

An example method for aided ambient Internet-of-Things signaling includes: obtaining, at the first network entity, one or more ambient device signal configuration characteristics for the ambient device; obtaining, at the first network entity, one or more sensing/positioning signal configuration characteristics; and transmitting, from the first network entity to one or more UE/RAN nodes (user equipment/radio access network nodes), a combined ambient and sensing/positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

Another example first network entity includes: means for obtaining one or more ambient device signal configuration characteristics for the ambient device; means for obtaining one or more sensing/positioning signal configuration characteristics; and means for transmitting, to one or more UE/RAN nodes (user equipment/radio access network nodes), a combined ambient and sensing/positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

An example non-transitory, processor-readable storage medium includes processor-readable instructions to cause one or more processors of a network entity to: obtain one or more ambient device signal configuration characteristics for the ambient device; obtain one or more sensing/positioning signal configuration characteristics; and transmit, to one or more UE/RAN nodes (user equipment/radio access network nodes), a combined ambient and sensing/positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

DETAILED DESCRIPTION

Figure 1:
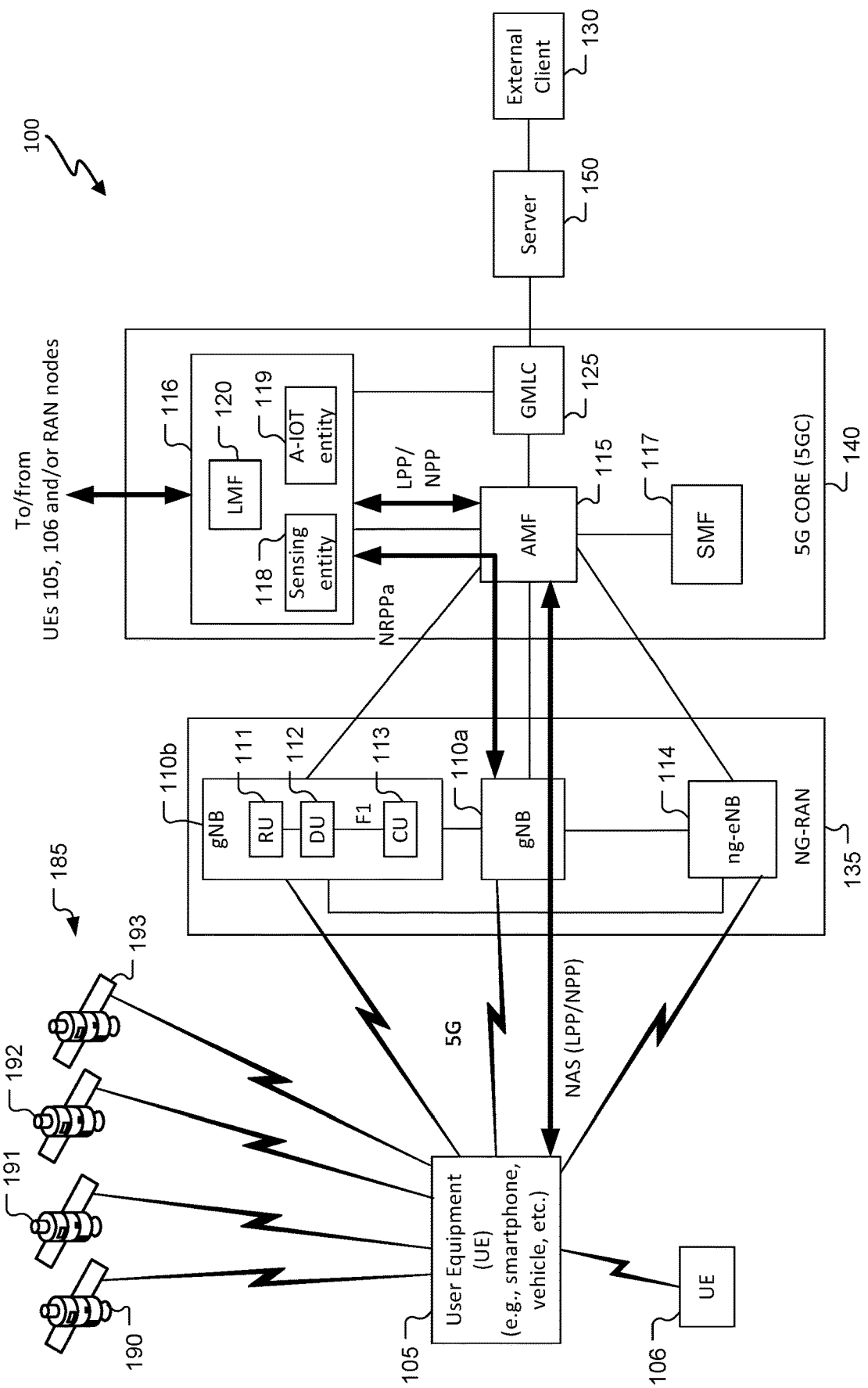
FIG. 1 is a simplified diagram of an example wireless communications system.

Techniques are discussed herein for providing aided A-IoT processing, where an A-IoT processing signal is combined with another signal type, e.g., a sensing/positioning signal (a sensing signal, a positioning signal, or a combined sensing-and-positioning signal). For example, due to similarities between A-IoT processing and sensing (or positioning) activities, A-IoT processing and sensing (or positioning) may be coordinated together, e.g., by a single entity, to use one signal from both A-IoT processing and sensing (or positioning). A single entity may select one or more signal transmitters and one or more signal receivers, and establish and provide a signal configuration, for a multi-purpose signal. For example, a combined-purpose signal may be configured that may be transmitted and used for A-IoT processing and sensing. As another example, a combined-purpose signal may be configured that may be transmitted and used for A-IoT processing and positioning. As another example, a combined-purpose signal may be configured that may be transmitted and used for A-IoT processing, sensing, and positioning. For aiding A-IoT processing, a transmit (Tx) transmission/reception point (TRP) and receive (Rx) TRP may be selected that are near to, or part of, an ongoing sensing session or an ongoing positioning session such that A-IoT may piggyback on the ongoing session to relay signals by an A-IoT device. Other configurations/implementations, however, may be used.

Items and/or techniques described herein may provide one or more of the following capabilities, as well as other capabilities not mentioned. Signaling overhead and/or signal collisions may be reduced. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

Radio frequency sensing (RF sensing) may be used to determine information about an environment of a device. In RF sensing, an RF signal is transmitted by a transmitter, reflected off a target object, and received by a receiver. The received signal may be used to determine characteristics of the target object, e.g., location, size, material, movement, etc. RF sensing may be achieved using various techniques such as radar, radio frequency identification (RFID), and/or wireless sensor networks. In RFID techniques, RF signals may be used for identification and/or tracking. Tags or transponders that contain a unique identifier may communicate with RFID readers using RF signals. By placing the RFID tags on objects, the objects may be identified, tracked, and managed. RF sensing may be used for a variety of applications such as automotive (collision avoidance, autonomous driving, adaptive cruise control, etc.), surveillance and security, object detection, inventory management, medication management, environmental monitoring, etc.

Ambient IoT (ambient Internet of Things) devices (also known as A-IoT devices, ambient devices, or ambient smart devices) may be unobstrusive devices that may blend into the environment and provide information, called ambient information, and/or perform tasks in a subtle and unobtrusive manner. Ambient information provided by an A-IoT device may include environmental information obtained from one or more sensors of the A-IoT device and/or information about the A-IoT device (e.g., energy storage, charging rate, and/or discharging rate). An ambient device may harvest energy from an environment in which the ambient device is exposed, e.g., from solar energy, wind, etc. A-IoT devices may be referred to herein as tags RF tags (Radio Frequency tags such as RFID tags (RF identification tags)). A-IoT devices may gather and present information passively. A-IoT devices may leverage one or more sensors, connectivity, and data processing capabilities to gather, possibly analyze, and share information, and/or may provide feedback and/or perform automated actions. There are numerous types of A-IoT devices in existence with more to be developed. For example, ambient displays may convey information through visual cues such as changing colors, patterns, and/or brightness. As another example, ambient lighting may intelligently adjust lighting such as color, intensity, and/or timing of lights based on one or more factors such as natural lighting conditions, user preferences, events, etc. As another example, ambient audio devices may use sound (e.g., speech) to provide information and/or interact with a user (e.g., a voice-controlled speaker that provide news, plays music, and/or responds to user inquiries). As another example, an ambient sensor may use one or more sensors to collect environmental data (e.g., temperature, humidity, air quality, etc.) and may provide the collected data to a user, to a network entity (e.g., through a wireless connection), etc. As another example, an ambient actuator may perform one or more actions based on input data and possibly one or more parameters such as user preferences (e.g., smart blinds that adjust based on sunlight intensity and a user preference). As another example, an ambient assistant may provide a virtual assistant or chatbot that may use natural language processing and machine learning to provide recommendations, reminders, and/or other assistance to a user. A-IoT devices may be used for a variety of purposes, e.g., for automated checkout at a store, for monitoring medication intake by a subject, for a vehicle ignition fob, for tracking perishable goods, for metering, etc.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT." a "client device," a "wireless device," a "subscriber device," a "subscriber terminal," a "subscriber station," a "user terminal" or UT, a "mobile terminal," a "mobile station." a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-cNB) 114, and the 5GC 140 includes an Access and Mobility Management Function (AMF) 115, a Session Management Function (SMF) 117, network entities 116 (including a sensing entity 118, an A-IoT entity 119, and a Location Management Function (LMF) 120), and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the network entities 116, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110a, 110b and/or the ng-eNB 114 may be configured to communicate with the UE 105 via multiple carriers. Each of the gNBs 110a. 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. Implementations described herein may provide A-IoT signal configurations and positioning signal configurations and/or sensing signal configurations to UEs and/or RAN nodes (e.g., base stations such as the gNBs 110a, 110b) and coordinate A-IoT operations and RF sensing and/or positioning operations. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*. 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The sensing entity 118, the A-IoT entity 119, and the LMF 120 may communicate directly with the UE 105, e.g., through wireless communications, or directly with the gNBs 110a, 110b and/or the ng-eNB 114. The sensing entity 118 may support RF sensing operations and process RF sensing requests and the A-IoT entity 119 may support A-IoT operations and process A-IoT requests. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-cNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates, sensing information, and/or A-IoT information of and/or provided by the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the network entities 116 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the network entities 116, and/or between the ng-eNB 114 and the network entities 116, via the AMF 115. As further illustrated in FIG. 1, the network entities 116 and the UE 105 may communicate using an LTE Positioning Protocol (LPP), which may be defined in 3GPP TS 36.355. The network entities 116 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the network entities 116 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-cNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. One or more of the network entities 116 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the network entities 116 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi® APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the position of the UE.

Figure 2:
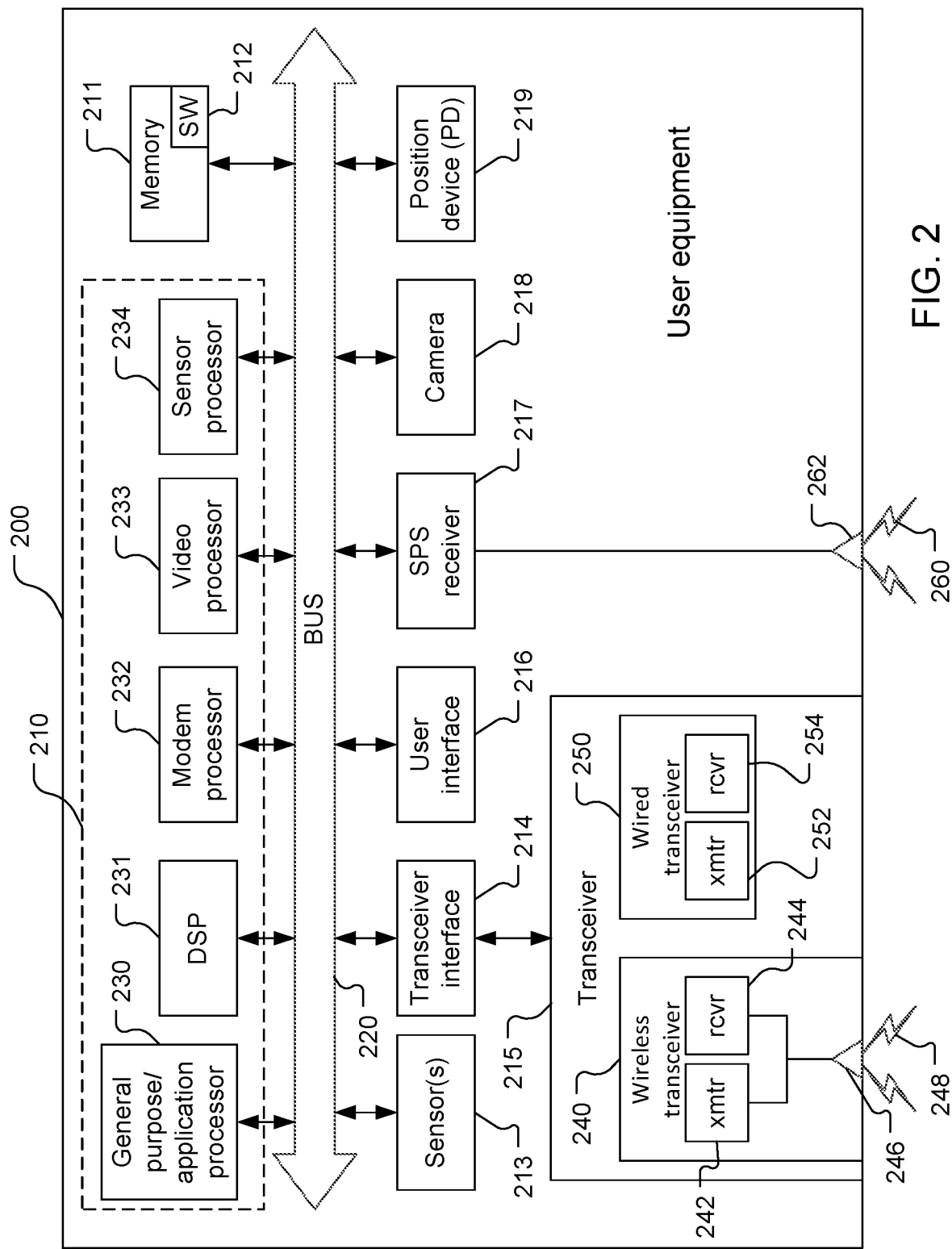
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214. e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
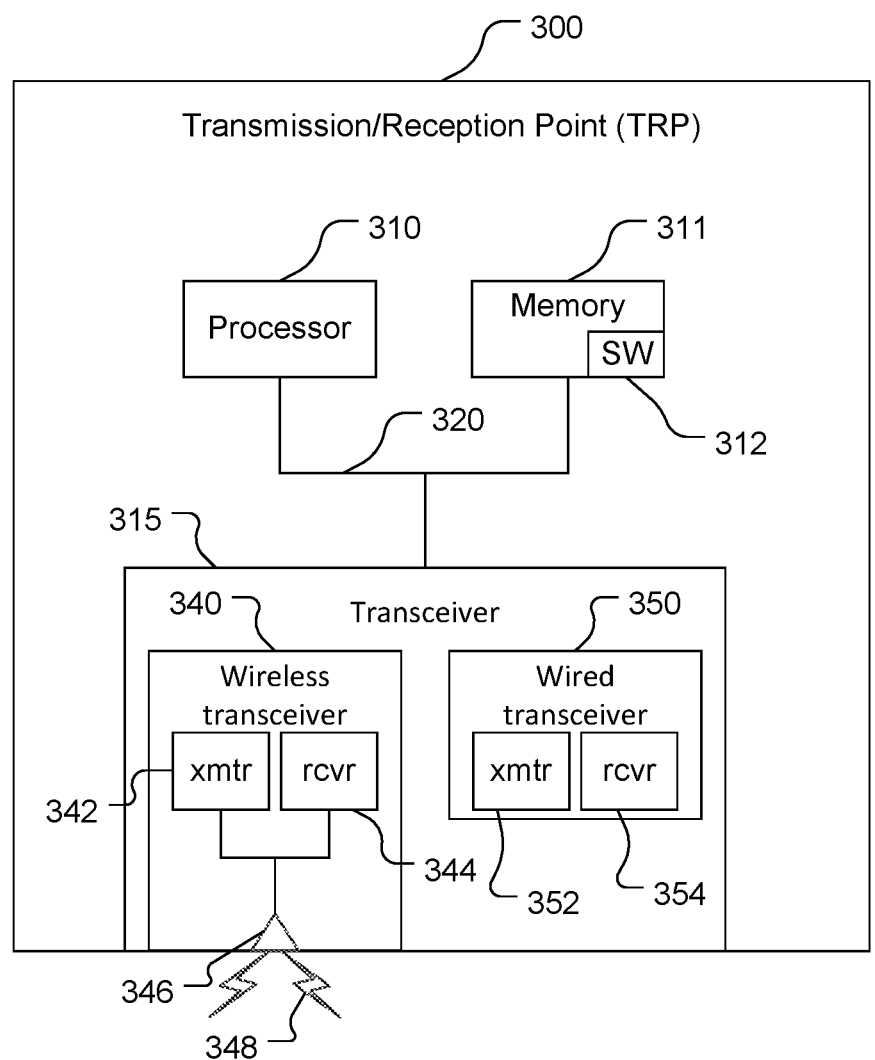
FIG. 3 is a block diagram of components of an example transmission/reception point shown in FIG. 1.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110a, 110b and/or the ng-cNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
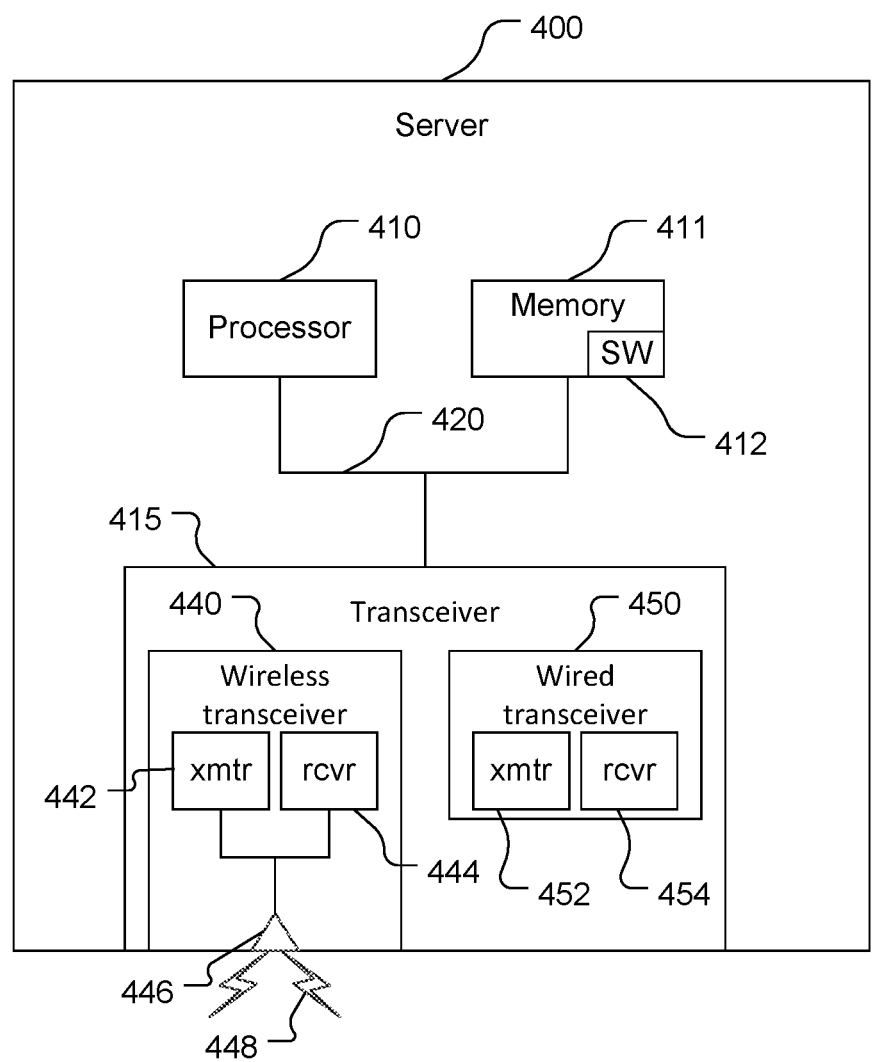
FIG. 4 is a block diagram of components of an example server shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AOD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference TRx-Tx (i.e., UE TRx-Tx or UERx-Tx) between the ToA of the RTT measurement signal and the transmission time of the RTT response message in a payload of each RTT response message. The RTT response message would include a reference signal from which the base station can deduce the ToA of the RTT response. By comparing the difference TTx-Rx between the transmission time of the RTT measurement signal from the base station and the ToA of the RTT response at the base station to the UE-reported time difference TRx-Tx, and subtracting the UERx-Tx, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-Positioning FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Positioning and/or Sensing Behavior

Figure 5:
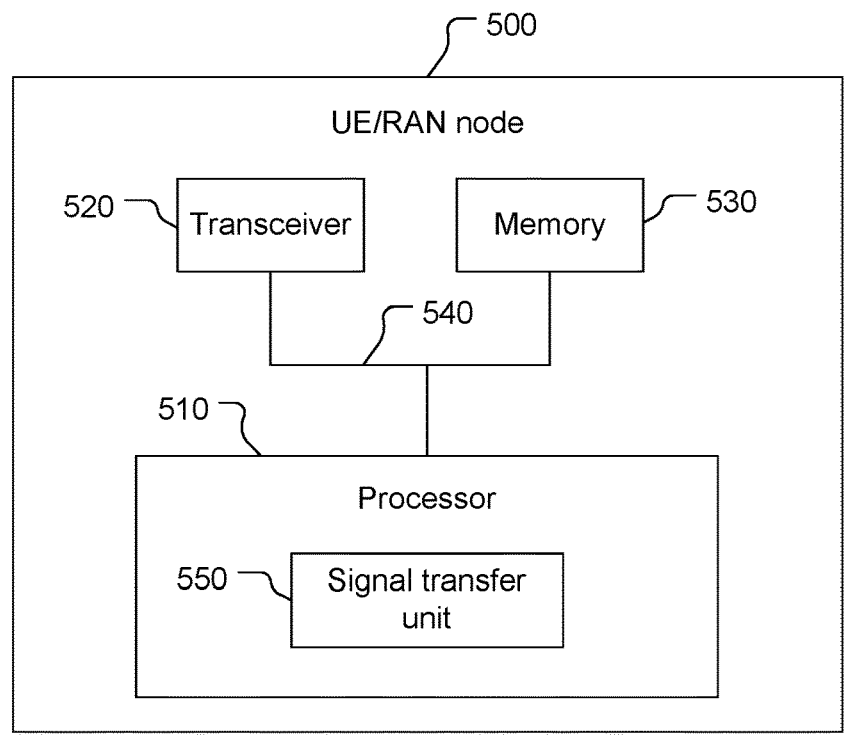
FIG. 5 is a block diagram of an example UE/RAN (User Equipment/Radio Access Network) node.

Referring also to FIG. 5, a UE/RAN node 500 includes a processor 510, a transceiver 520, and a memory 530 communicatively coupled to each other by a bus 540. Even if referred to in the singular, the processor 510 may include one or more processors, the transceiver 520 may include one or more transceivers (e.g., one or more transmitters and/or one or more receivers), and the memory 530 may include one or more memories. The UE/RAN node 500 is a network device that may be a UE or a RAN device, e.g., a base station or TRP such as a gNB. The UE/RAN node 500 may include the components shown in FIG. 5. The UE/RAN node 500 may include one or more other components such as any of those shown in FIG. 2 such that the UE 200 may be an example of the UE/RAN node 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE/RAN node 500 performing a function as shorthand for one or more appropriate components (e.g., the processor 510 and the memory 530) of the UE/RAN node 500 performing the function. The processor 510 (possibly in conjunction with the memory 530 and, as appropriate, the transceiver 520) may include a signal transfer unit 550. The signal transfer unit 550 may be configured to send and/or receive signals such as sensing signals and/or positioning signals. The signal transfer unit 550 may be configured to receive and decode A-IoT signals (e.g., A-IoT information modulated on a positioning signal (a modulated positioning signal) or a A-IoT information modulated on a sensing signal (a modulated sensing signal)). The signal transfer unit 550 is discussed further below, and the description may refer to the processor 510 generally, or the UE/RAN node 500 generally, as performing any of the functions of the signal transfer unit 550, with the UE/RAN node 500 being configured to perform the function(s).

Figure 6:
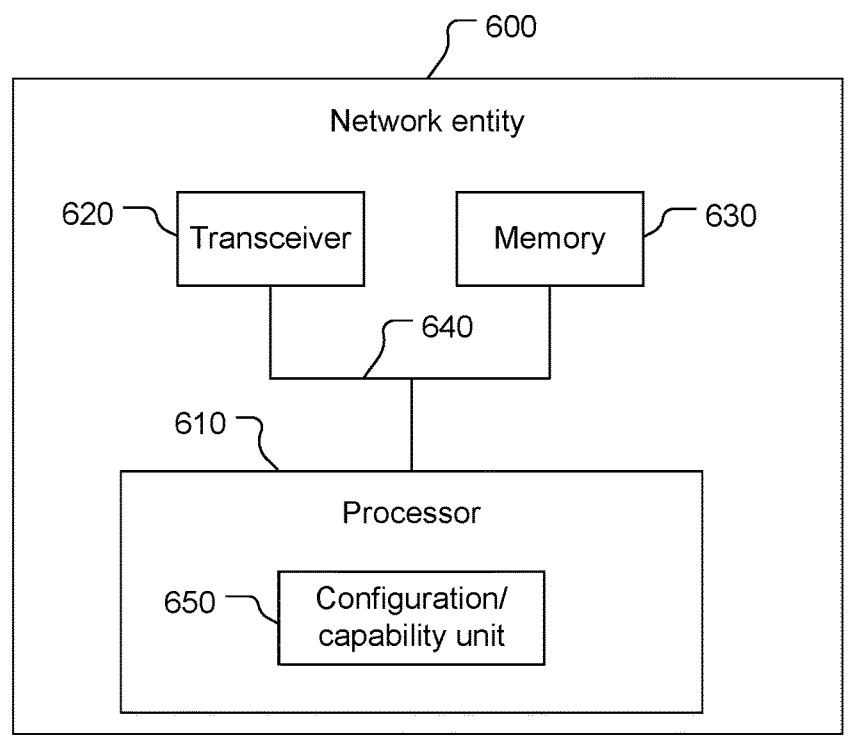
FIG. 6 is a block diagram of an example network entity.

Referring also to FIG. 6, a network entity 600 includes a processor 610, a transceiver 620, and a memory 630 communicatively coupled to each other by a bus 640. The network entity 600 may be, for example, a base station, a TRP, a server, an example of the SMF, an example of the sensing entity 118, an example of the A-IoT entity 119, or an example of the LMF 120. Even if referred to in the singular, the network entity 600 may include one or more network entities, the processor 610 may include one or more processors, the transceiver 620 may include one or more transceivers (e.g., one or more transmitters and/or one or more receivers), and the memory 630 may include one or more memories. The network entity 600 may include the components shown in FIG. 6. The network entity 600 may include one or more other components such as any of those shown in FIG. 4 such that the server 400 may be an example of the network entity 600. For example, the processor 610 may include one or more of the components of the processor 410. The transceiver 620 may include one or more of the components of the transceiver 415. The memory 630 may be configured similarly to the memory 411, e.g., including software with processor-readable instructions configured to cause the processor 610 to perform functions. Also or alternatively, the network entity 600 may include one or more other components such as any of those shown in FIG. 3 such that the TRP 300 may be an example of the network entity 600. For example, the processor 610 may include one or more of the components of the processor 310. The transceiver 620 may include one or more of the components of the transceiver 315. The memory 630 may be configured similarly to the memory 311, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the network entity 600 (or an example thereof, e.g., a sensing entity, an A-IoT entity, etc.) performing a function as shorthand for one or more appropriate components (e.g., the processor 610 and the memory 630) of the network entity 600 performing the function. The processor 610 (possibly in conjunction with the memory 630 and, as appropriate, the transceiver 620) may include a configuration/capability unit 650. The configuration/capability unit 650 is discussed further below, and the description may refer to the processor 610 generally, or the network entity 600 generally, as performing any of the functions of the configuration/capability unit 650, with the network entity 600 being configured to perform the function(s). For example, the configuration/capability unit 650 of an A-IoT entity may be configured to provide one or more capabilities of an A-IoT device and/or one or more signaling configuration parameters. As another example, the configuration/capability unit 650 may be omitted from an LMF network entity. As another example, the configuration/capability unit 650 of a sensing entity or positioning entity may be configured to request A-IoT device capabilities and/or provide UE/RAN node capabilities and/or determine and provide signal configuration parameters.

Figure 7:
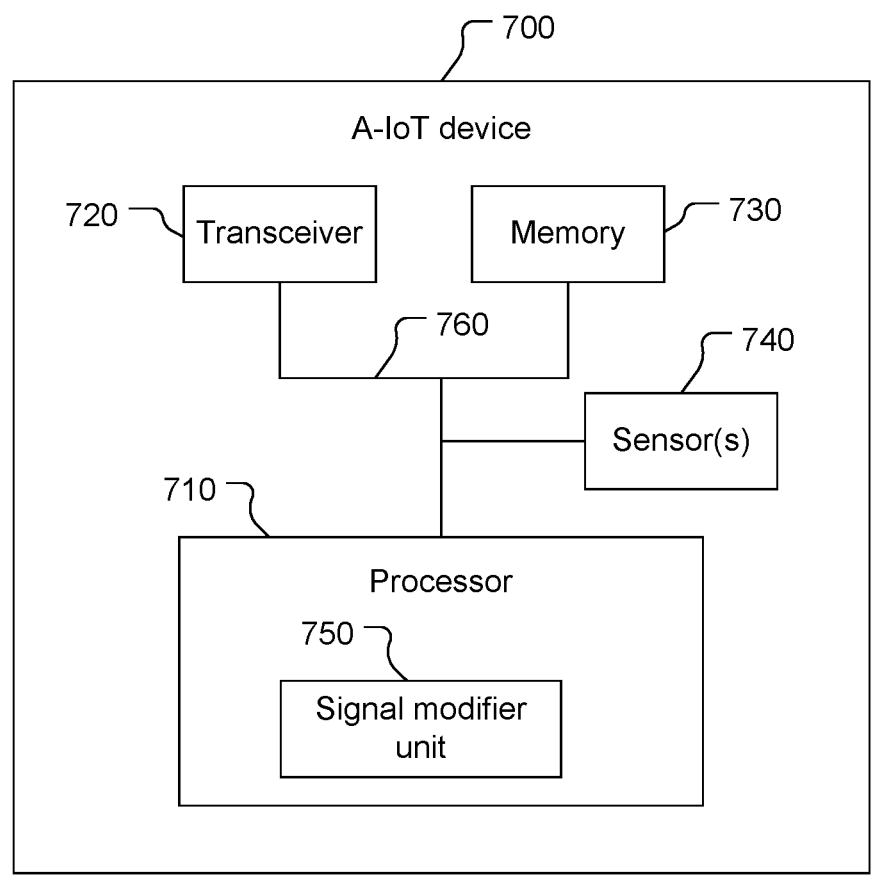
FIG. 7 is a block diagram of an example A-IoT (Ambient Internet-of-Things) device.

Referring also to FIG. 7, an A-IoT device 700 includes a processor 710, a transceiver 720, a memory 730, and one or more sensors 740 communicatively coupled to each other by a bus 760. The sensor(s) 740 may include one or more of a variety of sensors, e.g., a thermometer, a barometer, a humidity sensor, an air quality sensor, a microphone, a light detector, etc. Even if referred to in the singular, the A-IoT device 700 may include one or more network entities, the processor 710 may include one or more processors, the transceiver 720 may include one or more transceivers (e.g., one or more transmitters and/or one or more receivers), and the memory 730 may include one or more memories. The A-IoT device 700 may include the components shown in FIG. 7, and may include one or more other components. The memory 730 may be configured similarly to the memory 211, e.g., including software with processor-readable instructions configured to cause the processor 710 to perform functions. The transceiver 720 may include one or more of the components of the transceiver 215.

The description herein may refer to the processor 710 performing a function, but this includes other implementations such as where the processor 710 executes software (stored in the memory 730) and/or firmware. The description herein may refer to the A-IoT device 700 performing a function as shorthand for one or more appropriate components (e.g., the processor 710 and the memory 730 and one or more of the sensor(s) 740) of the A-IoT device 700 performing the function. The processor 710 (possibly in conjunction with the memory 730 and, as appropriate, the transceiver 720 and one or more of the sensor(s) 740) may include a signal modifier unit 750. The signal modifier unit 750 is discussed further below, and the description may refer to the processor 710 generally, or the A-IoT device 700 generally, as performing any of the functions of the signal modifier unit 750, with the A-IoT device 700 being configured to perform the function(s). For example, the signal modifier unit 750 may be configured to receive an incoming signal, modify the incoming signal by modulating the incoming signal with the measured information, and cause the modulated signal to be propagated as a backscattered signal.

The A-IoT device 700 may be of any of a variety of configurations. For example, the A-IoT device 700 may be an RFID tag. Reading or processing of an A-IoT tag may be performed to enable RFID-tag-reading-like functionality and/or capability. The A-IoT device 700 may be a passive device, a semi-passive device, or an active device. For example, the A-IoT device 700 may be a passive A-IoT device (configured for passive operation) that does not store energy, perform signal generation, or perform signal amplification, but can passively modulate an incoming signal to produce a backscatter signal. As another example, the A-IoT device 700 may be a semi-passive device (configured for semi-passive operation) configured to store energy, not configured to perform signal generation, and that may be configured to perform signal amplification (e.g., by a power amplifier (PA) and/or a low-noise amplifier (LNA)) to produce a backscattered signal. An A-IoT device configured for semi-passive operation may be configured to selectively operate in a semi-passive manner or a passive manner. As another example, the A-IoT device 700 may be an active device (configured for active operation) configured to store energy and perform signal generation. An A-IoT device configured for active operation may be configured to selectively operate in an active manner or a semi-passive manner, or may be configured to selectively operate in an active manner or a passive manner, or may be configured to selectively operate in an active manner, a semi-passive manner, or a passive manner. Tag reading extracts information from a backscattered signal from an A-IoT device (with the information having been added to (modulated onto) an incoming signal to the A-IoT device to produce the backscattered signal. A backscattered signal may be directed back toward a source of an incoming signal and/or in one or more other directions (e.g., including one or more directions away from the source of the incoming signal).

Figure 8:
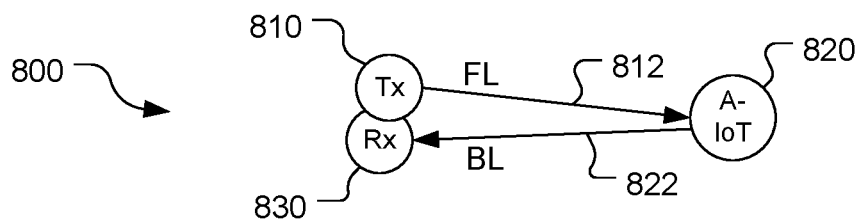
FIG. 8 is a block diagram of a monostatic A-IT system.
Figure 9:
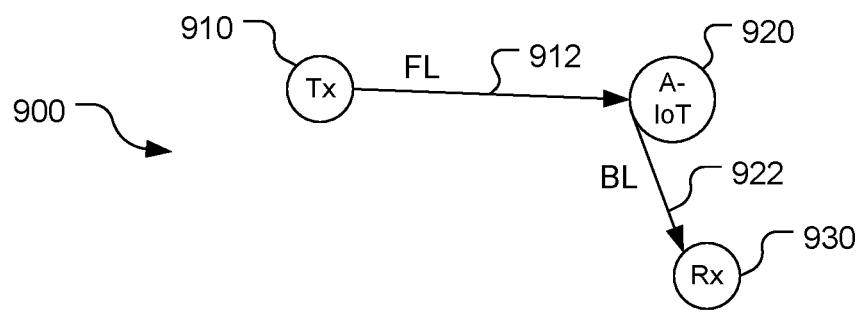
FIG. 9 is a block diagram of a bistatic A-IoT system.

Referring also to FIGS. 8 and 9, various configurations of A-IoT systems, such as monostatic A-IoT systems or bistatic A-IoT systems, may be implemented. For example, as shown in FIG. 8, a monostatic A-IoT system 800 includes a transmit node 810, an A-IoT device 820, and a receive node 830. In this case, the transmit node 810 and the receive node 830 are co-located and may be portions of a single physical device. The transmit node 810 may transmit an FL signal 812 (forward link signal), and the A-IoT device 820 may backscatter (e.g., reflect, amplify and transmit, produce and transmit) a BL signal 822 (backscatter link signal) based on the incoming signal, i.e., the FL signal 812. The receive node 830 may receive and measure and/or decode the BL signal 822, e.g., to extract ambient information (also called A-IoT information) added to (e.g., modulated onto) the FL signal 812 to produce the BL signal 822. For example, the receive node 830 may use a codebook to decode the BL signal 822 to extract the ambient information. A transmit (Tx) node or a receive (Rx) node may be, for example, a UE, a TRP, or a RAN node. As shown in FIG. 9, a bistatic A-IoT system 900 includes a transmit node 910, an A-IoT device 920, and a receive node 930. In this case, the transmit node 910 and the receive node 930 are non-co-located. The transmit node 910 may transmit an FL signal 912, the A-IoT device 920 may backscatter a BL signal 922 based on the FL signal 912, and the receive node 930 may receive and measure and/or decode the BL signal 922.

Figure 10:
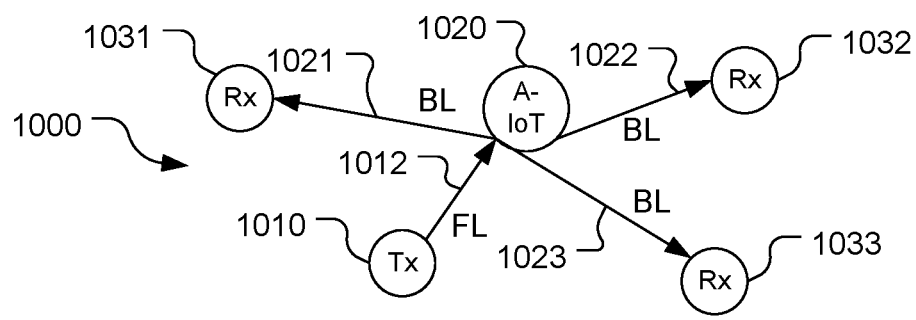
FIG. 10 is a block diagram of a multi-static A-IoT system.
Figure 11:
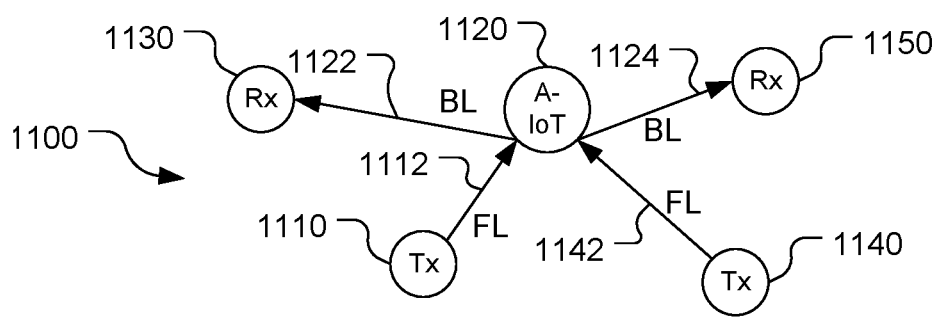
FIG. 11 is a block diagram of another multi-static A-IoT system.

Referring also to FIGS. 10 and 11, an A-IoT system may be configured as a multi-static A-IoT system, in which there are multiple transmit nodes and/or multiple receive nodes. In a multi-static A-IoT system, there may be one or more monostatic systems and/or one or more bistatic systems. FIGS. 10 and 11 show two examples of bistatic-based multi-static A-IoT systems. For example, a multi-static A-IoT system 1000 includes a transmit node 1010, an A-IoT device 1020, and receive nodes 1031, 1032, 1033. The transmit node 1010 may transmit an FL signal 1012, the A-IoT device 1020 may backscatter BL signals 1021, 1022, 1023 based on the FL signal 1012, and the receive nodes 1031-1033 may receive and measure and/or decode the BL signals 1021-1023, respectively. The BL signals 1021-1023 may be the same signal transmitted in different directions as shown. As another example, a multi-static A-IoT system 1100 includes transmit nodes 1110, 1140, an A-IoT device 1120, and receive nodes 1130, 1150. The transmit nodes 1110, 1140 may transmit FL signals 1112, 1142, respectively, and the A-IoT device 1120 may transmit BL signals 1122, 1124. The BL signal 1122 may be based on the FL signal 1112 alone, or on the FL signal 1142 alone, or may be multiple signals with one signal based on the FL signal 1112 and another signal based on the FL signal 1142. Similarly, the BL signal 1124 may be based on the FL signal 1112 alone, or on the FL signal 1142 alone, or may be multiple signals with one signal based on the FL signal 1112 and another signal based on the FL signal 1142.

Figure 12:
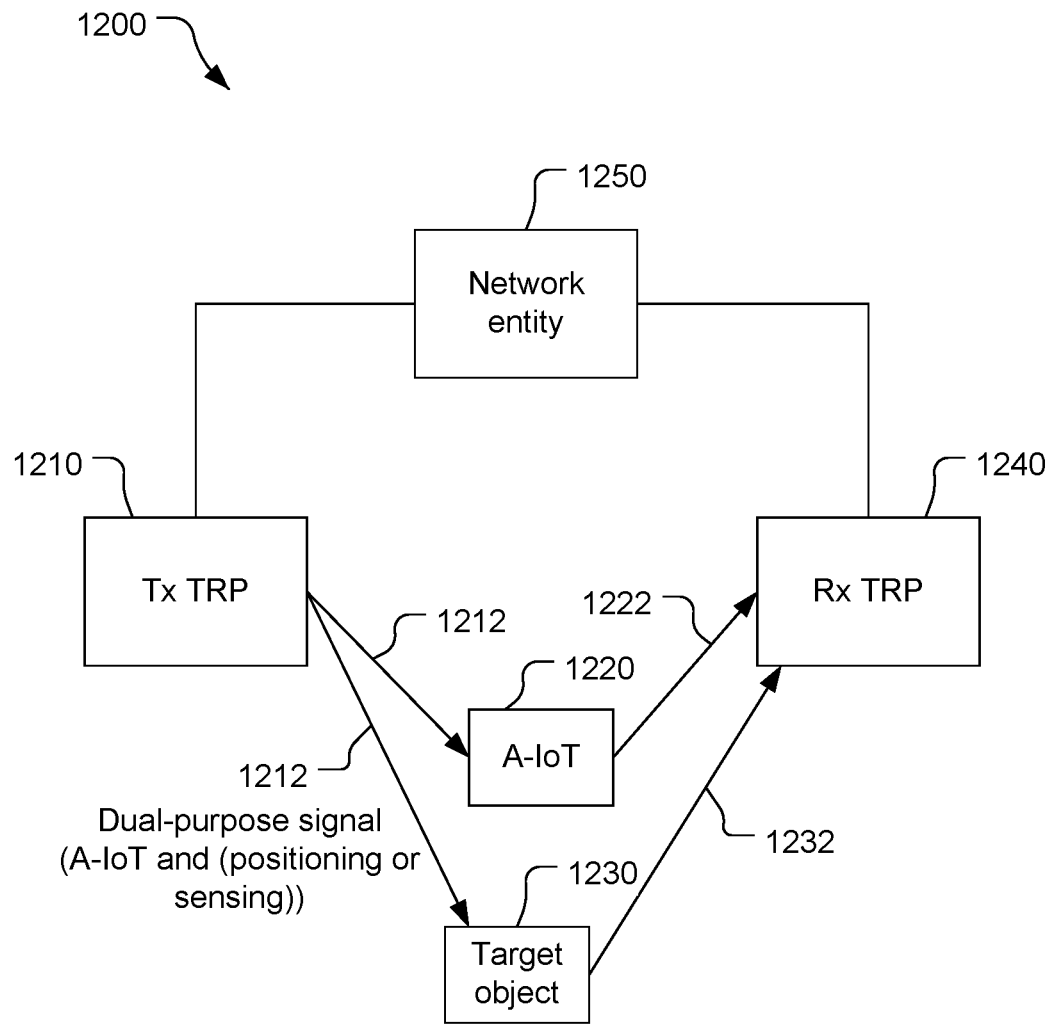
FIG. 12 is a block diagram of a combined A-IoT sensing/positioning system.

Referring to FIG. 12, an assisted A-IoT system 1200 includes a Tx node 1210, an A-IoT device 1220, a target object 1230, an Rx node 1240, and a network entity 1250. In this example, the Tx node 1210 is a Tx TRP (e.g., an example of the TRP 300) and the Rx node 1240 is an Rx TRP (e.g., an example of the TRP 300), but other forms of the Tx node 1210 and/or the Rx node 1240 may be used, e.g., a UE, a RAN node, etc. The network entity 1250 may be an example of the network entity 600. The system 1200 may assist A-IoT processing in that a positioning signal or a sensing signal may be used as an A-IoT signal, e.g., an incoming signal to the A-IoT device 1220 onto which the A-IoT device 1220 modulates ambient information. In a sensing system, there is a backscattered signal (e.g., reflected signal) without data being modulated onto the backscattered signal. In a positioning system, a positioning signal (e.g., a PRS) is transmitted and measured and a measurement may be reported and/or a return signal may be transmitted in response to reception of an incoming signal (e.g., for RTT positioning). As discussed herein, a positioning signal or a sensing signal may be used as an A-IoT signal for A-IoT processing instead of a dedicated A-IoT signal. Consequently, if an A-IoT device has nearby nodes to be used for sensing and/or positioning, an A-IoT entity (that is a network entity) that coordinates A-IoT processing may offload one or more tasks to another entity, e.g., an A-IoT device, an LMF or SMF. For example, while an A-IoT entity may typically choose the transmitter(s) and the receiver(s), and configure the A-IoT device for an A-IoT session, the A-IoT entity may offload one or more of these tasks to another entity. The A-IoT device 1220 may, for example, determine the Tx node and the Rx node (e.g., the UE(s)/RAN node(s) such as the nodes 1210, 1240) to use for aided A-IoT signaling, or may offload selection of one or more transmitters and/or one or more receivers. As another example, the A-IoT entity may offload determination of signal configuration for A-IoT processing (e.g., aided A-IoT processing). An ongoing positioning session or an ongoing sensing session may be leveraged for A-IoT signaling (to provide aided A-IoT). Alternatively, a positioning session or a sensing session may be initiated to help with A-IoT signaling. By leveraging a sensing session or a positioning session, one or more dedicated A-IoT signals may be avoided from being transmitted, and consequently traffic congestion and collisions may be reduced.

The system 1200 may be used for A-IoT processing. For example, the network entity 1250 may know the locations of the nodes 1210, 1240 and the A-IoT device 1220 such that the network entity 1250 may determine that the nodes 1210, 1240 may be used for A-IoT signaling with the A-IoT device 1220. The network entity 1250 may coordinate A-IoT signaling with the nodes 1210, 1240 and the A-IoT device 1220. For example, the network entity 1250, e.g., the configuration/capability unit 650, may provide signal configuration information to the nodes 1210, 1240 so that the Tx node 12101 may transmit a multi-purpose signal 1212. The multi-purpose signal 1212 may be a positioning signal (e.g., a PRS), or a sensing signal (e.g., PRS), or a sensing and positioning signal (e.g., PRS), that may also be used as an A-IoT signal. The A-IoT device 1220 may backscatter a backscatter signal 1222 based on the multi-purpose signal 1212. Backscattering by the A-IoT device 1220 may be modelled as a frequency shift Δf of the multi-purpose signal 1212 (the incoming signal) from the Tx node 1210 (or an incoming signal received from the target object 1230). The network entity 1250, e.g., the configuration/capability unit 650, may inform the Rx node 1240 of a payload of the A-IoT device 1220 such that the Rx node 1240 can decode a backscatter signal 1222 from the A-IoT device 1220 based on the multi-purpose signal 1212. Also or alternatively, the multi-purpose signal 1212 may include an indication (e.g., a command) for the Rx node 1240 to measure a reflected signal 1232 from the target object 1230 and to decode the payload of the A-IoT device 1220 (e.g., the signal 1212 may include information that the Rx node 1240 may use to decode the reflected signal 1232).

Figure 13:
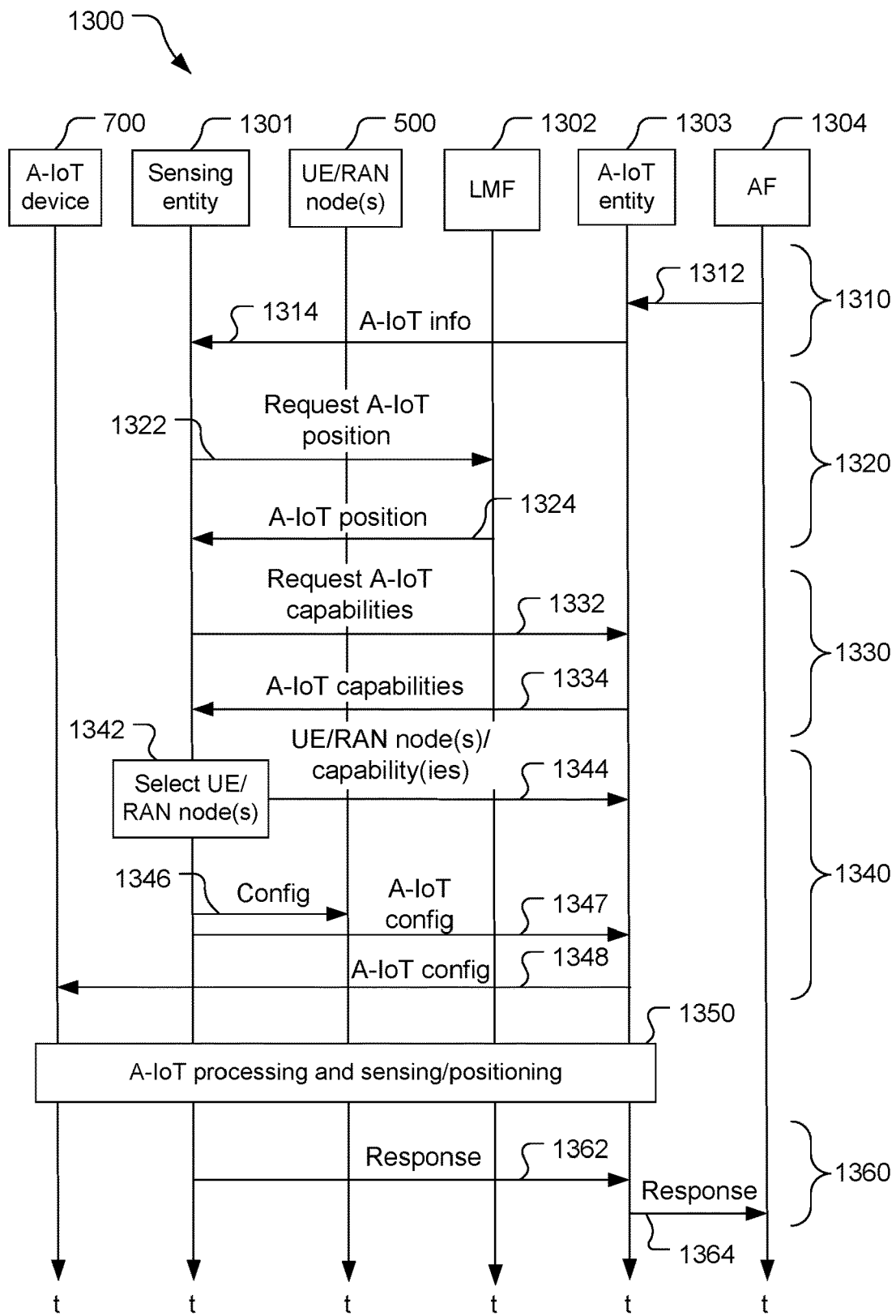
FIG. 13 is a signal and processing flow diagram for A-IoT processing combined with sensing and/or positioning.

Referring to FIG. 13, with further reference to FIGS. 1-12, a processing and signal flow 1300 for aided A-IoT includes the stages shown. The flow 1300 is an example of interaction between the A-IoT device 700, a sensing entity 1301, one or more UE/RAN nodes 500, an LMF 1302, an A-IoT entity 1303, and an AF 1304 (Application Function). Stages may be added to the flow 1300, rearranged, and/or removed. The flow 1300 discusses using the sensing entity 1301 to determine one or more UE/RAN nodes to assist with A-IoT processing, and leveraging one or more sensing signals for A-IoT processing. This is an example implementation of aided A-IoT processing, and other implementations of flows for aided A-IoT processing may be used. For example, the sensing entity 1301 may be replaced with a positioning entity (e.g., the LMF 1302) and a corresponding processing and signal flow may leverage one or more positioning signals for A-IoT processing. In sensing (or positioning) use cases, UEs/RAN nodes (including TRPs) helping in sensing may also help, as discussed herein, in A-IoT processing, providing low-cost overhead and conserving power because RF sensing (or positioning) and A-IoT processing have similar topologies and similar waveforms/signals may be used. The flow 1300 may thus be used to have multi-purpose signals (for A-IoT and for sensing and/or positioning), with A-IoT information piggybacked on a signal for sensing and/or positioning.

At stage 1310, the AF 1304 requests ambient IoT processing. For example, the AF 1304 may transmit an A-IoT processing request 1312 to the A-IoT entity 1303. The A-IoT processing request 1312 may request processing of one or more particular A-IoT devices, e.g., to obtain ambient information from one or more particular A-IoT devices. In this example, the A-IoT processing request 1312 from the AF 1304 includes a request for ambient information from the A-IoT device 700. The AF 1304 may be disposed at any of a variety of locations, e.g., within the A-IoT device 700, because the AF 1304 may be implemented by software, processing hardware, firmware, or a combination of two or more thereof. The A-IoT entity 1303 may be a core network entity and may be an example of the network entity 600. Also at stage 1310, the A-IoT entity 1303, in response to receiving the A-IoT processing request 1312, transmits an A-IoT information message 1314 to the sensing entity 1301. The A-IoT information message 1314 may provide an indication of the A-IoT device 700 from which ambient information is to be determined, and possibly other information, such as one or more A-IoT signal configuration parameters (e.g., waveform, modulation, bandwidth, power, sequence). The message 1314 may include at least some of the information of a capability message 1334 discussed below.

At stage 1320, the sensing entity 1301 obtains the location of the A-IoT device 700 (from which ambient information has been requested). For example, the sensing entity 1301 may transmit an A-IoT position request 1322 to the LMF 1302. The LMF 1302 may retrieve a stored location of the A-IoT device 700 (e.g., stored in the memory 630 of the LMF 1302). The LMF 1302 may transmit an A-IoT position message 1324 to the sensing entity 1301 indicating the position (location) of the A-IoT device 700. The A-IoT device 700 may have one or more operational parameters that make relative location of the A-IoT device 700 and the UE(s)/RAN node(s) 500 important in selecting the UE(s)/RAN node(s) to help with A-IoT processing. For example, the A-IoT device 700 may have a minimum required SNR (Signal-to-Noise Ratio) of an incoming signal to be able to modulate the incoming signal with the ambient information. Thus, the A-IoT device 700 may need to be within a threshold distance of the UE/RAN node 500 for the UE/RAN node 500 to be useful in A-IoT processing for the A-IoT device 700. In addition to, or instead of, the LMF 1302 sending the A-IoT position to the sensing entity 1301, the A-IoT entity 1302 may request the A-IoT device location from the LMF 1302 and send the A-IoT device location to the sensing entity 1301.

At stage 1330, the sensing entity 1301 obtains capabilities of the A-IoT device 700. For example, the sensing entity 1301 may transmit a request A-IoT capabilities message 1332 to the A-IoT entity 1303. The A-IoT entity 1303, e.g., the configuration/capability unit 650 of the A-IoT entity 1303, may retrieve (e.g., from the memory 630) one or more capabilities of the A-IoT device 700 and transmit an A-IoT capabilities message 1334 to the sensing entity 1301 indicating the one or more capabilities of the A-IoT device 700. Also or alternatively, one or more capabilities of the A-IoT device 700 may be provided to the sensing entity 1301 by a TRP (e.g., a gNB), the LMF 1302, and/or the A-IoT device 700. For example, the sensing entity 1301 may establish a communication link with the A-IoT device 700 and request capabilities of the A-IoT device 700 directly from the A-IoT device 700. Capabilities of the A-IoT device 700 may include: required input power to energize the A-IoT device 700 (e.g., a chip of the A-IoT device 700) to produce a backscatter signal, a required charging rate, wireless energy conversion efficiency, maximum energy storage capacity, maximum memory size (e.g., in case a configuration and/or data will be retrieved from the A-IoT device 700, a number of rectifiers, a number of supported frequency bands, a supported bandwidth, a number of supported bandwidth parts (BWP), supported waveform(s), supported modulation (s), supported coding(s) to receive commands/queries, supporting coding(s) for backscattering, an ability to maintain timing an clock accuracy, a clock calibration ability, and/or a type/class of the A-IoT device 700. The ability to maintain timing and clock accuracy may include frequency drift and maximum clock frequency error. The type/class of the A-IoT device 700 may include a capability to generate signals or not (e.g., whether the A-IoT device 700 is an active device, a semi-passive device, or a passive device). The class of the A-IoT device 700 may determine a range, a coverage, and/or a sensitivity that may be used in selecting the UE(s)/RAN node(s) to help with A-IoT processing. The A-IoT entity 1303 may provide one or more of the A-IoT capabilities in the A-IoT information message 1314 instead of in response to a request from the sensing entity 1301.

At stage 1340, one or more UE/RAN nodes are selected for assisting with A-IoT processing, and the one or more selected UE/RAN nodes and the A-IoT device 700 are provided with combined A-IoT and sensing/positioning signal configuration(s). At sub-stage 1342, the sensing entity 1301 selects one or more UE/RAN nodes for helping the A-IoT device 700 (e.g., to satisfy requirements for A-IoT processing and sensing (and/or positioning)). For example, the processor 610 of the sensing entity 1301 may use the location of the A-IoT device 700 and known locations of UE/RAN nodes to select one or more UE/RAN nodes. The processor 610 may, for example, select the UE/RAN node(s) such that the one or more selected UE/RAN nodes are within a threshold distance of the A-IoT device 700 and/or such that a signal strength of a A-IoT signal received by each of the one or more selected UE/RAN nodes is above a threshold strength. The processor 610 may select the UE/RAN node(s) based on one or more of the A-IoT capabilities and one or more of capabilities of each of the UE/RAN node(s), e.g., such that a signal may be configured for use in A-IoT processing and either sensing or positioning (or sensing and positioning). The sensing entity 1301, e.g., the configuration/capability unit 650, may transmit a UE/RAN node message 1344 to the A-IoT entity 1303 indicating the selected UE/RAN node(s) and one or more corresponding capabilities of the selected UE/RAN node(s). Also or alternatively, the UE/RAN node capability (ies) may be provided to the A-IoT entity 1303 by a TRP (e.g., a gNB), the LMF 1302, or the A-IoT entity 1303 (e.g., obtained previously, e.g., from a communication with the sensing entity 1301).

The UE/RAN node message 1344 may indicate one or more UE/RAN node capabilities. The UE/RAN node capability (ies) indicated in the message 1344 may include one or more of: support for A-IoT bandwidth; supported number of reference signal transmissions and changes of reference signals for adding A-IoT-specific signals; maximum transmit power; supported waveform(s); and supported modulation (s). Adding A-IoT-specific signals may include adding preambles or sync signals or adding command(s)/query (ies) to A-IoT devices, e.g., that could depend on A-IoT device class.

Also at stage 1340, the sensing entity 1301, e.g., the configuration/capability unit 650, may transmit a configuration message 1346 to the selected UE/RAN node(s) and a configuration message 1347 to the A-IoT entity 1303. The messages 1346, 1347 may indicate one or more multipurpose signal configuration parameters based on one or more A-IoT reference signal configuration parameters and one or more sensing signal configuration parameters (and/or one or more positioning signal configuration parameters) and one or more capabilities of the UE/RAN node(s) 500 and one or more capabilities of the A-IoT device 700. The message 1360 conveys a configuration of a multi-purpose signal that can be used for A-IoT processing and sensing and/or positioning, and that can be transmitted by (i.e., is within the transmit capability of) one or more of the UE/RAN nodes 500, modulated by (i.e., is within the modulation capability of) the A-IoT device 700, and received and measured and/or decoded by (i.e., is within the reception and measurement and/or decoding capability of) one or more of the UE/RAN nodes 500. The sensing signal configuration parameter(s) may be obtained from the memory 630 of the sensing entity 1301 and may include bandwidth, waveform, power, sounding pattern, muting pattern, etc. Similarly, for aided A-IoT processing using a positioning signal, the LMF 1302 may obtain one or more positioning signal parameters from the memory 630 of the LMF 1302. The one or more A-IoT reference signal configuration parameters may be determined by the sensing entity 1301, e.g., based on one or more capabilities of the A-IoT device 700 and one or more capabilities of the selected UE/RAN node(s). The A-IoT reference signal configuration parameters may include parameters for: energy signal resources (that could exploit reference signal resources and/or data signal resources); beam management at Tx/Rx nodes (e.g., QCL (Quasi-Co-Location) relations); a muting pattern (e.g., transmission muting pattern among Tx nodes); synch signals added to help with A-IoT processing; a preamble signal for each reference signal; a command/query added to each reference signal or group of reference signals; and a waveform configuration including waveform, modulation, bandwidth, power, and sequence.

Also at stage 1340, the A-IoT entity 1303 may transmit an A-IoT configuration message 1348 to the A-IoT device 700 indicating A-IoT signal configuration information. The message 1348 may include A-IoT reference signal configuration parameters similar to the message 1347. The message 1348 may be different from the message 1347. For example, the message 1348 may omit configuration parameters for beam management contained in the message 1347. The A-IoT entity 1303 may determine the A-IoT reference signal configuration parameters based on one or more capabilities of the A-IoT device 700 and one or more capabilities of the selected UE/RAN node(s) and applying the same logic as the sensing entity 1301, or the sensing entity 1301 may send the A-IoT entity 1303 the A-IoT reference signal configuration parameters in the message 1347.

At stage 1350, A-IoT processing and sensing/positioning are performed. The selected transmit UE/RAN node(s) 500 transmit one or more corresponding configured transmit signals configured for A-IoT and configured for positioning and/or sensing. The A-IoT device 700, e.g., the signal modifier unit 750, modifies one or more incoming signals from the selected transmit UE/RAN node(s) 500, e.g., modulates the incoming signal(s) with ambient information (e.g., data from one or more of the sensor(s) 740), and backscatters one or more corresponding modified signals. One or more Rx UE/RAN nodes 500 measure one or more backscattered signals from the A-IoT device 700. Ambient information may be decoded by one or more Rx UE/RAN nodes 500. One or more measurements may be made by one or more Rx UE/RAN nodes 500 for positioning and/or sensing. For example, measurements for sensing may be provided by one or more UE/RAN nodes 500 to the sensing entity 1301.

At stage 1360, ambient information may be provided to the AF 1304 in response to the request 1312. For example, the sensing entity 1301 may transmit a response message 1362 to the A-IoT entity 1303. The response message 1362 may include ambient information provide by the A-IoT device 700 and decoded by one or more UE/RAN nodes 500 (or provided to and decoded by the sensing entity 1301). The A-IoT entity 1303 may transmit some or all of the ambient information in the response message 1362 to the AF 1304 in a response message 1364. The ambient information in the response message 1364 may include data requested in the request 1312 (including, for example, sensor information and/or energy information (e.g., battery level, charging rate, discharging rate)).

Figure 14:
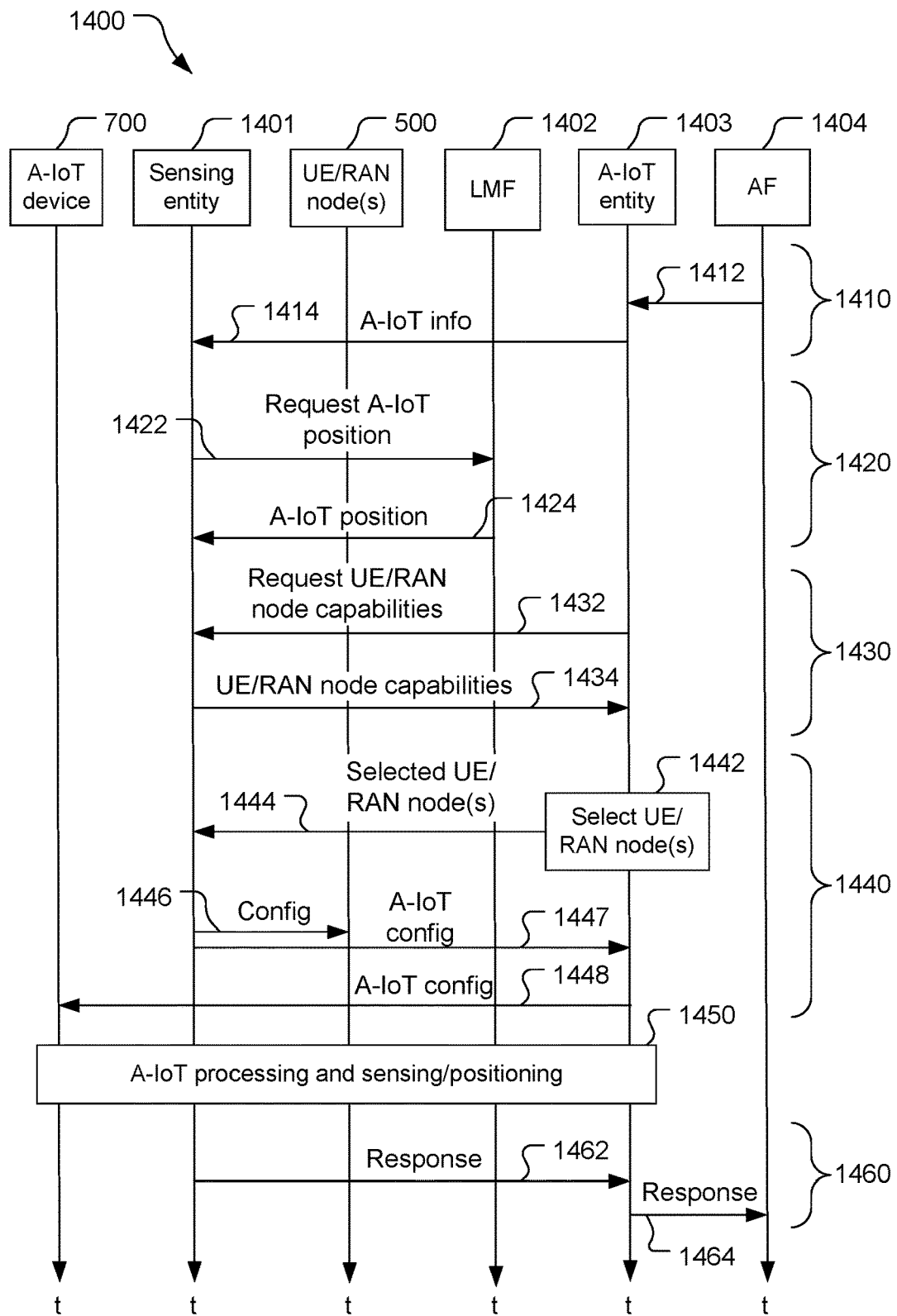
FIG. 14 is another signal and processing flow diagram for A-IoT processing combined with sensing and/or positioning.

Referring to FIG. 14, with further reference to FIGS. 1-13, a processing and signal flow 1400 for aided A-IoT includes the stages shown. The flow 1400 is an example of interaction between the A-IoT device 700, a sensing entity 1401, one or more UE/RAN nodes 500, an LMF 1402, an A-IoT entity 1403, and an AF 1404. Stages may be added to the flow 1400, rearranged, and/or removed. Similar to the flow 1300, the flow 1400 may be used to determine one or more UE/RAN nodes to assist with A-IoT processing, and leveraging one or more sensing signals and/or one or more positioning signal for A-IoT processing. In the flow 1400, stages 1410, 1420, 1450, and 1460, are similar to stages 1310, 1320, 1350, and 1360, with a request 1412, a message 1414, a request 1422, and messages 1424, 1462, 1464 being similar to the request 1312, the message 1314, the request 1322, and the messages 1324, 1362, 1364.

At stage 1430, the A-IoT entity 1403 may obtain UE/RAN node capabilities in order to select UE/RAN nodes for providing aided A-IoT for the A-IoT device 700 to help the A-IoT device 700 with A-IoT processing. The A-IoT entity 1403, e.g., the configuration/capability unit 650, may transmit a request 1432 for UE/RAN node capabilities. The sensing entity 1401, e.g., the configuration/capability unit 650, may obtain (e.g., retrieve from memory or from UE/RAN nodes) capabilities of UE/RAN nodes (e.g., within a threshold distance of the A-IoT device 700) and transmit a UE/RAN node capabilities message 1434 to the A-IoT entity 1403 in response to the request 1432 and indicating the obtained UE/RAN node capabilities.

At sub-stage 1442 of stage 1440, the A-IoT entity 1403 selects one or more UE/RAN nodes for helping the A-IoT device 700 with A-IoT processing. For example, the A-IoT entity 1403 may select the one or more UE/RAN nodes similarly to the discussion of sub-stage 1342. The A-IoT entity 1403 may transmit a selected UE/RAN node(s) message 1444 to the sensing entity 1401 indicating the one or more selected UE/RAN nodes for use in aided A-IoT processing. Further, messages 1446, 1447, 1448 transmitted from the sensing entity 1401 and the A-IoT entity 1403, respectively, may be similar to the messages 1346, 1347, 1348.

The flows 1300 and 1400 are examples, and other implementations may be used. For example, the request 1332 and/or the request 1432 may be omitted if the capabilities are already known by the sensing entity 1301 (or positioning entity) or the A-IoT entity 1403, respectively. The capabilities may already be known, for example, from a previous and/or an existing sensing (or positioning) session. As another example, capability information may be obtained from an entity other than the entity indicated in the flow 1300 or the flow 1400. For example, UE/RAN node capability information may be obtained from an LMF and/or from the UE/RAN nodes. Still other implementations may be used. As another example, the sensing entity 1301, 1401 may be omitted from the either or both of the flows 1300, 1400 respectively, e.g., if a positioning session is used, rather than a sensing session, for aided A-IoT processing.

Figure 15:
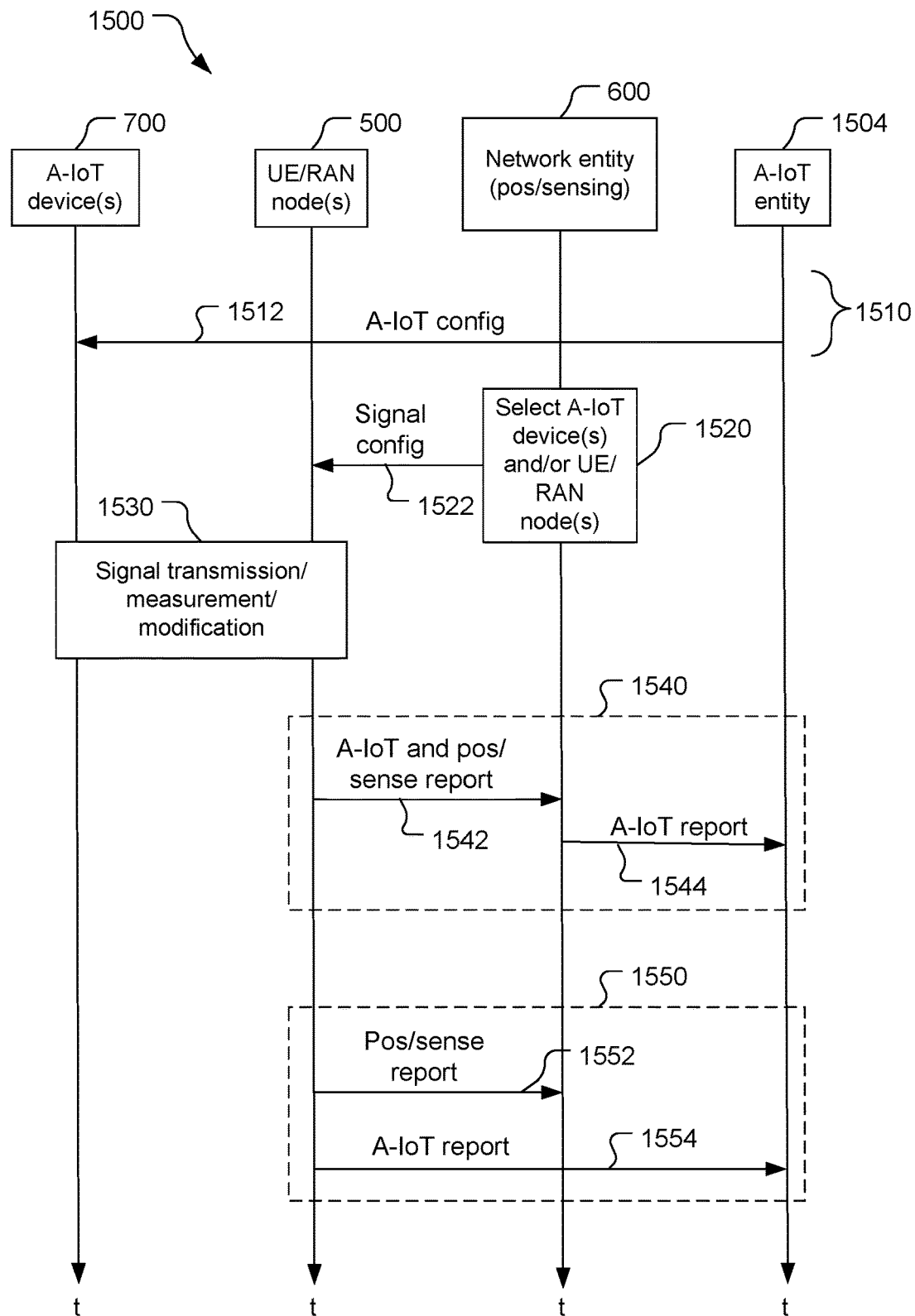
FIG. 15 is another signal and processing flow diagram for A-IoT processing combined with sensing and/or positioning.

Referring to FIG. 15, with further reference to FIGS. 1-14, a processing and signal flow 1500 for aided A-IoT includes the stages shown. The flow 1500 is an example of interaction between one or more A-IoT devices 700, one or more UE/RAN nodes 500, the network entity 600 (which may be a sensing entity (e.g., an SMF) or a positioning entity (e.g., an LMF)), and an A-IoT entity 1504. Stages may be added to the flow 1500, rearranged, and/or removed. For example, a stage 1540 and/or a stage 1550 may be omitted from the flow 1500.

At stage 1510, the A-IoT entity 1504 provides an A-IoT configuration message 1512 to each of one or more A-IoT devices 700. The message 1512 may be unicast (e.g., and may have different content for different recipients), multi-cast, or broadcast. The A-IoT configuration message 1512 may include, for example, one or more of the capabilities that may be included in the A-IoT capabilities message 1334.

At stage 1520, the network entity 600 selects the one or more A-IoT devices 700 to be helped and/or selects the one or more UE/RAN nodes 500 to help with A-IoT processing, and obtains and provides A-IoT signal configuration parameters. The one or more A-IoT devices 700 to be helped are the one or more A-IoT devices 700 to have a multi-purpose signal (a sensing/positioning signal and A-IoT signal) provided to the A-IoT device(s) 700 for A-IoT processing. For example, the network entity 600, e.g., the configuration/capability unit 650, may be configured to use one or more capabilities of the network entity 600 and/or one or more capabilities of the A-IoT device(s) 500 and/or locations of UE/RAN nodes and locations of A-IoT devices to select the one or more A-IoT devices 700 and/or to select the one or more UE/RAN nodes 500. The one or more A-IoT device capabilities may include a scrambling sequence and/or a frequency shift of a backscattered signal. The network entity 600, e.g., the configuration/capability unit 650, may obtain (e.g., retrieve from the memory 630 or determine) A-IoT signal configuration parameters and transmit a signal configuration message 1522 to the selected UE/RAN node(s) 500 with configuration parameters for a multi-purpose signal for A-IoT processing and for sensing and/or positioning. The message 1522 may be unicast (e.g., and may have different content for different recipients), multi-cast, or broadcast. The signal configuration message 1522 may indicate a number of the A-IoT device(s) 700 in addition to signal configuration information to help the UE/RAN node(s) 500 decode signals transmitted at stage 1530.

At stage 1530, one or more multi-purpose signals are transmitted, modulated, received, and measured/decoded. One or more of the UE/RAN node(s) 500 transmit one or more multi-purpose signals based on the signal configuration information in the signal configuration message 1522. The A-IoT device(s) 700 modulate one or more received signals with ambient information and transmit one or more corresponding backscattered signals. The A-IoT device(s) 700 may add waveforms and sync signals to received sensing/positioning signals (sensing signals, positioning signals, or combined sensing-and-positioning signals). Commands for the A-IoT device(s) 700 may be included in the message 1522 and/or added to the sensing/positioning signals. One or more of the UE/RAN node(s) 500 may decode the ambient information from one or more received backscattered signals and/or measure one or more received backscattered signals. For example, the receiver(s) of the UE/RAN node(s) 500 receive one or more RF reflections from an environment in which the UE/RAN node(s) 500 are disposed, with the reflection(s) including a mix of one or more backscattered signals and one or more other signals. The receiver(s) may be configured to decode signals differently based on frequency of signals and scrambling codes. Delay information (e.g., knowledge of receipt order based on signal transmission timing and expected A-IoT device position) of backscattered signals may be used by the receiver(s) to help with decoding the ambient information. The receiver(s) may use power information (e.g., from the signal configuration message 1522) to help with an order of decoding (based on expected A-IoT device position). For example, a receiver may decode higher-power signals first, before object reflection signals, as the higher-power signals are easier to decode. The receiver may then process remaining signals to determine position information and/or sensing information.

At stage 1540, decoded ambient information and measured sensing information and/or measured positioning information may be reported. For example, one or more of the UE/RAN node(s) 500 that received one or more backscattered signals may transmit an A-IoT and positioning/sensing report 1542 to the network entity 600. The report 1542 may include decoded ambient information and/or may include positioning information and/or may include sensing information. The network entity 600 may transmit an A-IoT report 1544 to the A-IoT entity 1504. The A-IoT report 1544 may include ambient information from the A-IoT device 700 and positioning/sensing report 1542. The A-IoT report 1544 may include ACK/NACK (Acknowledge/Negative acknowledge) of the transmission. The A-IoT report 1544 may include energy information, e.g., charging rate(s) of one or more A-IoT devices 700, discharging rate(s) of one or more A-IoT devices 700, and/or energy level(s) of one or more A-IoT devices 700.

At stage 1550, the UE/RAN node(s) 500 may transmit information to the network entity 600 and/or to the A-IoT entity 1504. For example, the UE/RAN noed(s) 500 may transmit a positioning/sensing report 1552 to the network entity 600 with positioning information and/or sensing information, e.g., similar to the report 1542. The UE/RAN node(s) 500 may also or alternatively transmit an A-IoT report 1554 to the A-IoT entity 1504 including ambient information from the A-IoT device 700.

Figure 16:
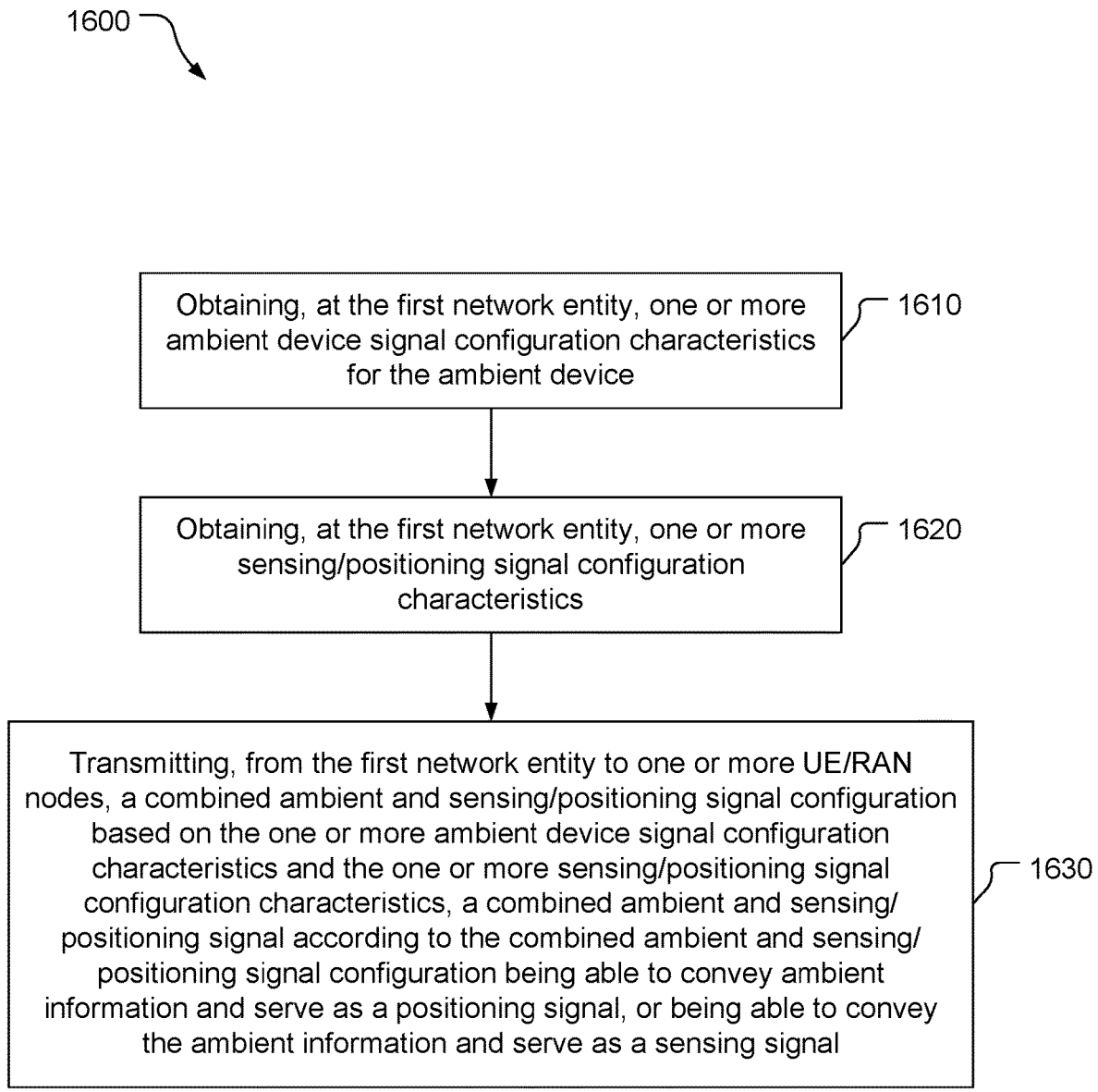
FIG. 16 is a block flow diagram of a method for aided A-IoT signaling.

Referring to FIG. 16, with further reference to FIGS. 1-15, a method 1600 for aided ambient Internet-of-Things signaling includes the stages shown. The method 1600 is, however, an example only and not limiting. The method 1600 may be altered, e.g., by having one or more stages added, removed, rearranged, combined, performed concurrently, and/or having one or more single stages split into multiple stages.

At stage 1610, the method 1600 includes obtaining, at the first network entity, one or more ambient communication device signal configuration characteristics for the ambient device. For example, at stage 1310, the sensing entity 1301 may receive the A-IoT information message 1314 with one or more A-IoT signal configuration parameters. Also or alternatively, the sensing entity 1301 may retrieve one or more A-IoT signal configuration parameters from the memory 630 and/or may receive one or more A-IoT signal configuration parameters from the A-IoT device 700. The processor 610, possibly in combination with the memory 630, possibly in combination with the transceiver 620 (e.g., the wireless receiver 444 and the antenna 446, and/or the wired receiver 454) may comprise means for obtaining the one or more ambient communication device signal configuration characteristics.

At stage 1620, the method 1600 includes obtaining, at the first network entity, one or more sensing/positioning signal configuration characteristics. For example, at stage 1340, the sensing entity 1301 may obtain one or more sensing/positioning signal configuration parameters from the memory 630 of the sensing entity 1301 and/or from the LMF 1302 (for positioning signal parameters). The processor 610, possibly in combination with the memory 630, possibly in combination with the transceiver 620 (e.g., the wireless receiver 444 and the antenna 446, and/or the wired receiver 454) may comprise means for obtaining the one or more sensing/positioning signal configuration characteristics.

At stage 1630, the method 1600 includes transmitting, from the first network entity to one or more UE/RAN nodes, a combined ambient and sensing/positioning signal configuration based on the one or more ambient communication device signal configuration characteristics and the one or more sensing/positioning signal configuration characteristics, a combined ambient and sensing/positioning signal according to the combined ambient and sensing/positioning signal being able to convey ambient information and serve as a positioning signal, or being able to convey the ambient information and serve as a sensing signal. For example, at stage 1340 the sensing entity 1301 (or a positioning entity such as the LMF 1302) transmits the configuration message 1346 to one or more UE/RAN nodes 500 and/or the message 1347 to the A-IoT entity 1303 for a multi-purpose signal that can be used for A-IoT processing and for sensing and/or positioning. A multi-purpose signal according to the signal configuration in the message(s) 1346, 1347 will be within the capabilities of one or more UE/RAN nodes 500 for transmitting the multi-purpose signal, within the capabilities of the A-IoT device 700 to modulate the multi-purpose signal, and within the capabilities of one or more UE/RAN nodes 500 to receive and decode and measure the modulated multi-purpose signal. The processor 610, possibly in combination with the memory 630, in combination with the transceiver 620 (e.g., the wireless transmitter 442 and the antenna 446, and/or the wired transmitter 452) may comprise means for transmitting the combined ambient and sensing/positioning signal configuration.

Implementations of the method 1600 may include one or more of the following features. In an example implementation, the method 1600 includes: receiving, at the first network entity from at least one of the one or more UE/RAN nodes, ambient information that was added to the combined ambient and sensing/positioning signal by the ambient device; and transmitting the ambient information from the first network entity to a second network entity. For example, at stage 1350, the UE/RAN node(s) receive one or more backscattered signals from the A-IoT device 700, decode the ambient information from the A-IoT device 700, and transmit at least the ambient information to the sensing entity 1301, and the sensing entity 1301 receives the ambient information. At stage 1360, the sensing entity 1301 transmits the ambient information in the response message 1362 to the A-IoT entity 1303. The processor 610, possibly in combination with the memory 630, possibly in combination with the transceiver 620 (e.g., the wireless receiver 444 and the antenna 446, and/or the wired receiver 454) may comprise means for receiving the ambient information. The processor 610, possibly in combination with the memory 630, in combination with the transceiver 620 (e.g., the wireless transmitter 442 and the antenna 446, and/or the wired transmitter 452) may comprise means for transmitting the ambient information. In another example implementation, the method 1600 includes receiving, at the first network entity from at least one of the one or more UE/RAN nodes, sensing measurement information corresponding to the combined ambient and sensing/positioning signal. For example, at stage 1350, the sensing entity receives sensing information measured by one or more of the UE/RAN node(s) 500 from a backscattered multi-purpose signal. The processor 610, possibly in combination with the memory 630, possibly in combination with the transceiver 620 (e.g., the wireless receiver 444 and the antenna 446, and/or the wired receiver 454) may comprise means for receiving the sensing information.

Also or alternatively, implementations of the method 1600 may include one or more of the following features. In an example implementation, the method 1600 includes selecting, by the first network entity, the one or more UE/RAN nodes based on one or more positions of the one or more UE/RAN nodes and the position of the ambient device. For example, at stage 1342 the sensing entity 1301 may select one or more UE/RAN nodes as discussed above.

The processor 610, possibly in combination with the memory 630, may comprise means for selecting the one or more UE/RAN nodes. In another example implementation, the one or more UE/RAN nodes are one or more selected UE/RAN nodes, and the method 1600 further includes: transmitting, from the first network entity, one or more UE/RAN node capabilities; and receiving, at the first network entity from, an indication of the one or more selected UE/RAN nodes; wherein transmitting the combined ambient and sensing/positioning signal configuration comprises transmitting the combined ambient and sensing/positioning signal configuration to the one or more selected UE/RAN nodes based on the first network entity receiving the indication of the one or more selected UE/RAN nodes. For example, at stage 1430, the sensing entity 1401 may transmit the UE/RAN node capabilities message 1434 (e.g., in response to the request 1432) and receive the selected UE/RAN node(s) message 1444 indicating the selected UE/RAN node(s) 500. The processor 610, possibly in combination with the memory 630, in combination with the transceiver 620 (e.g., the wireless transmitter 442 and the antenna 446, and/or the wired transmitter 452) may comprise means for transmitting the one or more UE/RAN node capabilities. The processor 610, possibly in combination with the memory 630, possibly in combination with the transceiver 620 (e.g., the wireless receiver 444 and the antenna 446, and/or the wired receiver 454) may comprise means for receiving the indication of the one or more selected UE/RAN nodes.

Also or alternatively, implementations of the method 1600 may include one or more of the following features. In an example implementation, the method 1600 includes: requesting, by the first network entity, one or more ambient device capabilities; receiving, by the first network entity, the one or more ambient device capabilities; requesting a location of the ambient device; receiving the location of the ambient device; and selecting the one or more UE/RAN nodes based on the one or more ambient device capabilities and the location of the ambient device. For example, at stage 1330, the sensing entity 1301 may transmit the request A-IoT capabilities message 1332 and receive the A-IoT capabilities message 1334 indicating one or more A-IoT device capabilities. At stage 1320, the sensing entity 1301 may transmit the A-IoT position request 1322 and receive the A-IoT position message 1324 indicating the location of the A-IoT device 700. At sub-stage 1342, the sensing entity 1301 may select one or more UE/RAN nodes based on the ambient device capability (ies) and the location of the A-IoT device 700. The processor 610, possibly in combination with the memory 630, in combination with the transceiver 620 (e.g., the wireless transmitter 442 and the antenna 446, and/or the wired transmitter 452) may comprise means for requesting the one or more ambient device capabilities and means for requesting the location of the ambient device. The processor 610, possibly in combination with the memory 630, possibly in combination with the transceiver 620 (e.g., the wireless receiver 444 and the antenna 446, and/or the wired receiver 454) may comprise means for receiving the one or more ambient device capabilities and the location of the ambient device. The processor 610, possibly in combination with the memory 630, may comprise means for selecting the one or more UE/RAN nodes.

Also or alternatively, implementations of the method 1600 may include one or more of the following features. In an example implementation, the method 1600 includes obtaining, at a first network entity, a position of an ambient device. For example, at stage 1320, the sensing entity 1301 (e.g., the network entity 600) obtains an A-IoT device position from the LMF 1302 by requesting the position from the LMF 1302 and receiving the position from the LMF 1302. Also or alternatively, the sensing entity 1301 may retrieve the position from the memory 630 or receive the position from the A-IoT device 700 (directly or via one or more other devices, e.g., a TRP). The processor 610, possibly in combination with the memory 630, possibly in combination with the transceiver 620 (e.g., the wireless receiver 444 and the antenna 446, or the wired receiver 454) may comprise means for obtaining the position of the ambient device.

IMPLEMENTATION EXAMPLES

Implementation examples are provided in the following numbered clauses.

Clause 1. A first network entity comprising:
one or more transceivers;
one or more memories; and
one or more processors, communicatively coupled to the one or more transceivers and the one or more memories, configured to:
obtain one or more ambient device signal configuration characteristics for the ambient device;
obtain one or more sensing/positioning signal configuration characteristics; and
transmit, via the one or more transceivers to one or more UE/RAN nodes (user equipment/radio access network nodes), a combined ambient and sensing/positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

Clause 2. The first network entity of claim 1, wherein the one or more processors are configured to:
receive, via the one or more transceivers from at least one of the one or more UE/RAN nodes, ambient information that was added to the combined ambient and sensing/positioning signal by the ambient device; and
transmit the ambient information via the one or more transceivers to a second network entity.

Clause 3. The first network entity of claim 1, wherein the one or more processors are configured to receive, via the one or more transceivers from at least one of the one or more UE/RAN nodes, sensing measurement information corresponding to the combined ambient and sensing/positioning signal.

Clause 4. The first network entity of claim 1, wherein the one or more processors are configured to select the one or more UE/RAN nodes based on one or more positions of the one or more UE/RAN nodes and a position of the ambient device.

Clause 5. The first network entity of claim 1, wherein the one or more UE/RAN nodes are one or more selected UE/RAN nodes, and wherein the one or more processors are configured to:
transmit, via the one or more transceivers, one or more UE/RAN node capabilities;
receive, via the one or more transceivers, an indication of the one or more selected UE/RAN nodes; and transmit, via the one or more transceivers, the combined ambient and sensing/positioning signal configuration to the one or more selected UE/RAN nodes based on receiving the indication of the one or more selected UE/RAN nodes.

Clause 6. The first network entity of claim 1, wherein the one or more processors are configured to:
request, via the one or more transceivers, one or more ambient device capabilities;
receive, via the one or more transceivers, the one or more ambient device capabilities;
request, via the one or more transceivers, a position of the ambient device;
receive, via the one or more transceivers, the position of the ambient device; and
select the one or more UE/RAN nodes based on the one or more ambient device capabilities and the location of the ambient device.

Clause 7. A method for aided ambient Internet-of-Things signaling, the method comprising:
obtaining, at the first network entity, one or more ambient device signal configuration characteristics for the ambient device;
obtaining, at the first network entity, one or more sensing/positioning signal configuration characteristics; and
transmitting, from the first network entity to one or more UE/RAN nodes (user equipment/radio access network nodes), a combined ambient and sensing/positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

Clause 8. The method of claim 7, further comprising:
receiving, at the first network entity from at least one of the one or more UE/RAN nodes, ambient information that was added to the combined ambient and sensing/positioning signal by the ambient device; and
transmitting the ambient information from the first network entity to a second network entity.

Clause 9. The method of claim 7, further comprising receiving, at the first network entity from at least one of the one or more UE/RAN nodes, sensing measurement information corresponding to the combined ambient and sensing/positioning signal.

Clause 10. The method of claim 7, further comprising selecting, by the first network entity, the one or more UE/RAN nodes based on one or more positions of the one or more UE/RAN nodes and a position of the ambient device.

Clause 11. The method of claim 7, wherein the one or more UE/RAN nodes are one or more selected UE/RAN nodes, and wherein the method further comprises:
transmitting, from the first network entity, one or more UE/RAN node capabilities; and
receiving, at the first network entity, an indication of the one or more selected UE/RAN nodes;
wherein transmitting the combined ambient and sensing/positioning signal configuration comprises transmitting the combined ambient and sensing/positioning signal configuration to the one or more selected UE/RAN nodes based on the first network entity receiving the indication of the one or more selected UE/RAN nodes.

Clause 12. The method of claim 7, further comprising:
requesting, by the first network entity, one or more ambient device capabilities;
receiving, by the first network entity, the one or more ambient device capabilities;
requesting a position of the ambient device;
receiving the position of the ambient device; and
selecting the one or more UE/RAN nodes based on the one or more ambient device capabilities and the position of the ambient device.

Clause 13. A first network entity comprising:
means for obtaining one or more ambient device signal configuration characteristics for the ambient device;
means for obtaining one or more sensing/positioning signal configuration characteristics; and
means for transmitting, to one or more UE/RAN nodes (user equipment/radio access network nodes), a combined ambient and sensing/positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

Clause 14. The first network entity of claim 13, further comprising:
means for receiving, from at least one of the one or more UE/RAN nodes, ambient information that was added to the combined ambient and sensing/positioning signal by the ambient device; and
means for transmitting the ambient information to a second network entity.

Clause 15. The first network entity of claim 13, further comprising means for receiving, from at least one of the one or more UE/RAN nodes, sensing measurement information corresponding to the combined ambient and sensing/positioning signal.

Clause 16. The first network entity of claim 13, further comprising means for selecting the one or more UE/RAN nodes based on one or more positions of the one or more UE/RAN nodes and a position of the ambient device.

Clause 17. The first network entity of claim 13, wherein the one or more UE/RAN nodes are one or more selected UE/RAN nodes, and wherein the first network entity further comprises:
means for transmitting one or more UE/RAN node capabilities; and
means for receiving an indication of the one or more selected UE/RAN nodes;
wherein the means for transmitting the combined ambient and sensing/positioning signal configuration comprise means for transmitting the combined ambient and sensing/positioning signal configuration to the one or more selected UE/RAN nodes based on the first network entity receiving the indication of the one or more selected UE/RAN nodes.

Clause 18. The first network entity of claim 13, further comprising:
means for requesting one or more ambient device capabilities;
means for receiving the one or more ambient device capabilities;
means for requesting a position of the ambient device;

means for receiving the position of the ambient device; and means for selecting the one or more UE/RAN nodes based on the one or more ambient device capabilities and the location of the ambient device.

Clause 19. A non-transitory, processor-readable storage medium comprising processor-readable instructions to cause one or more processors of a network entity to:

obtain one or more ambient device signal configuration characteristics for the ambient device;

obtain one or more sensing/positioning signal configuration characteristics; and transmit, to one or more UE/RAN nodes (user equipment/radio access network nodes), a combined ambient and sensing/positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

Clause 20. The non-transitory, processor-readable storage medium of claim 19, further comprising processor-readable instructions to cause the one or more processors of the network entity to:

receive, from at least one of the one or more UE/RAN nodes, ambient information that was added to the combined ambient and sensing/positioning signal by the ambient device; and transmit the ambient information to a second network entity.

Clause 21. The non-transitory, processor-readable storage medium of claim 19, further comprising processor-readable instructions to cause one or more processors of a network entity to receive, from at least one of the one or more UE/RAN nodes, sensing measurement information corresponding to the combined ambient and sensing/positioning signal.

Clause 22. The non-transitory, processor-readable storage medium of claim 19, further comprising processor-readable instructions to cause one or more processors of a network entity to select the one or more UE/RAN nodes based on one or more positions of the one or more UE/RAN nodes and a position of the ambient device.

Clause 23. The non-transitory, processor-readable storage medium of claim 19, wherein the one or more UE/RAN nodes are one or more selected UE/RAN nodes, and wherein the non-transitory, processor-readable storage medium further comprises processor-readable instructions to cause one or more processors of a network entity to:

transmit one or more UE/RAN node capabilities; and
receive an indication of the one or more selected UE/RAN nodes;

wherein the processor-readable instructions to cause one or more processors of a network entity to transmit the combined ambient and sensing/positioning signal configuration comprise processor-readable instructions to cause one or more processors of a network entity to transmit the combined ambient and sensing/positioning signal configuration to the one or more selected UE/RAN nodes based on the first network entity receiving the indication of the one or more selected UE/RAN nodes.

Clause 24. The non-transitory, processor-readable storage medium of claim 19, further comprising processor-readable instructions to cause one or more processors of a network entity to:

request one or more ambient device capabilities;
receive the one or more ambient device capabilities;
request a position of the ambient device;
receive the position of the ambient device; and
select the one or more UE/RAN nodes based on the one or more ambient device capabilities and the location of the ambient device.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA. AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims.

Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of +20% or +10%, +5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A first network entity comprising:
one or more transceivers;
one or more memories; and
one or more processors, communicatively coupled to the one or more transceivers and the one or more memories, configured to:
obtain one or more ambient device signal configuration characteristics for the ambient device;
obtain one or more sensing/positioning signal configuration characteristics; and
transmit, via the one or more transceivers to one or more UE/RAN nodes (user equipment/radio access network nodes), a combined ambient and sensing/ positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

2. The first network entity of claim 1, wherein the one or more processors are configured to:
receive, via the one or more transceivers from at least one of the one or more UE/RAN nodes, ambient information that was added to the combined ambient and sensing/positioning signal by the ambient device; and
transmit the ambient information via the one or more transceivers to a second network entity.

3. The first network entity of claim 1, wherein the one or more processors are configured to receive, via the one or more transceivers from at least one of the one or more UE/RAN nodes, sensing measurement information corresponding to the combined ambient and sensing/positioning signal.

4. The first network entity of claim 1, wherein the one or more processors are configured to select the one or more UE/RAN nodes based on one or more positions of the one or more UE/RAN nodes and a position of the ambient device.

5. The first network entity of claim 1, wherein the one or more UE/RAN nodes are one or more selected UE/RAN nodes, and wherein the one or more processors are configured to:
transmit, via the one or more transceivers, one or more UE/RAN node capabilities;
receive, via the one or more transceivers, an indication of the one or more selected UE/RAN nodes; and
transmit, via the one or more transceivers, the combined ambient and sensing/positioning signal configuration to the one or more selected UE/RAN nodes based on receiving the indication of the one or more selected UE/RAN nodes.

6. The first network entity of claim 1, wherein the one or more processors are configured to:
request, via the one or more transceivers, one or more ambient device capabilities;
receive, via the one or more transceivers, the one or more ambient device capabilities;
request, via the one or more transceivers, a position of the ambient device;
receive, via the one or more transceivers, the position of the ambient device; and
select the one or more UE/RAN nodes based on the one or more ambient device capabilities and the location of the ambient device.

7. A method for aided ambient Internet-of-Things signaling, the method comprising:
obtaining, at the first network entity, one or more ambient device signal configuration characteristics for the ambient device;
obtaining, at the first network entity, one or more sensing/positioning signal configuration characteristics; and
transmitting, from the first network entity to one or more UE/RAN nodes (user equipment/radio access network nodes), a combined ambient and sensing/positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

8. The method of claim 7, further comprising:
receiving, at the first network entity from at least one of the one or more UE/RAN nodes, ambient information that was added to the combined ambient and sensing/positioning signal by the ambient device; and
transmitting the ambient information from the first network entity to a second network entity.

9. The method of claim 7, further comprising receiving, at the first network entity from at least one of the one or more UE/RAN nodes, sensing measurement information corresponding to the combined ambient and sensing/positioning signal.

10. The method of claim 7, further comprising selecting, by the first network entity, the one or more UE/RAN nodes based on one or more positions of the one or more UE/RAN nodes and a position of the ambient device.

11. The method of claim 7, wherein the one or more UE/RAN nodes are one or more selected UE/RAN nodes, and wherein the method further comprises:
transmitting, from the first network entity, one or more UE/RAN node capabilities; and
receiving, at the first network entity, an indication of the one or more selected UE/RAN nodes;
wherein transmitting the combined ambient and sensing/positioning signal configuration comprises transmitting the combined ambient and sensing/positioning signal configuration to the one or more selected UE/RAN nodes based on the first network entity receiving the indication of the one or more selected UE/RAN nodes.

12. The method of claim 7, further comprising:
requesting, by the first network entity, one or more ambient device capabilities;
receiving, by the first network entity, the one or more ambient device capabilities;
requesting a position of the ambient device;
receiving the position of the ambient device; and
selecting the one or more UE/RAN nodes based on the one or more ambient device capabilities and the position of the ambient device.

13. A first network entity comprising:
means for obtaining one or more ambient device signal configuration characteristics for the ambient device;
means for obtaining one or more sensing/positioning signal configuration characteristics; and
means for transmitting, to one or more UE/RAN nodes (user equipment/radio access network nodes), a combined ambient and sensing/positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

14. The first network entity of claim 13, further comprising:
means for receiving, from at least one of the one or more UE/RAN nodes, ambient information that was added to the combined ambient and sensing/positioning signal by the ambient device; and means for transmitting the ambient information to a second network entity.

15. The first network entity of claim 13, further comprising means for receiving, from at least one of the one or more UE/RAN nodes, sensing measurement information corresponding to the combined ambient and sensing/positioning signal.

16. The first network entity of claim 13, further comprising means for selecting the one or more UE/RAN nodes based on one or more positions of the one or more UE/RAN nodes and a position of the ambient device.

17. The first network entity of claim 13, wherein the one or more UE/RAN nodes are one or more selected UE/RAN nodes, and wherein the first network entity further comprises:

means for transmitting one or more UE/RAN node capabilities; and means for receiving an indication of the one or more selected UE/RAN nodes;

wherein the means for transmitting the combined ambient and sensing/positioning signal configuration comprise means for transmitting the combined ambient and sensing/positioning signal configuration to the one or more selected UE/RAN nodes based on the first network entity receiving the indication of the one or more selected UE/RAN nodes.

18. The first network entity of claim 13, further comprising:

means for requesting one or more ambient device capabilities;

means for receiving the one or more ambient device capabilities;

means for requesting a position of the ambient device;

means for receiving the position of the ambient device; and means for selecting the one or more UE/RAN nodes based on the one or more ambient device capabilities and the location of the ambient device.

19. A non-transitory, processor-readable storage medium comprising processor-readable instructions to cause one or more processors of a network entity to:

obtain one or more ambient device signal configuration characteristics for the ambient device;

obtain one or more sensing/positioning signal configuration characteristics; and transmit, to one or more UE/RAN nodes (user equipment/radio access network nodes), a combined ambient and sensing/positioning signal configuration based on the one or more ambient device signal configuration characteristics and the one or more sensing/positioning signal configuration characteristics, a combined ambient and sensing/positioning signal according to the combined ambient and sensing/positioning signal configuration being able to convey ambient information and serve as a positioning signal, or being able to convey the ambient information and serve as a sensing signal.

20. The non-transitory, processor-readable storage medium of claim 19, further comprising processor-readable instructions to cause the one or more processors of the network entity to:

receive, from at least one of the one or more UE/RAN nodes, ambient information that was added to the combined ambient and sensing/positioning signal by the ambient device; and transmit the ambient information to a second network entity.

21. The non-transitory, processor-readable storage medium of claim 19, further comprising processor-readable instructions to cause one or more processors of a network entity to receive, from at least one of the one or more UE/RAN nodes, sensing measurement information corresponding to the combined ambient and sensing/positioning signal.

22. The non-transitory, processor-readable storage medium of claim 19, further comprising processor-readable instructions to cause one or more processors of a network entity to select the one or more UE/RAN nodes based on one or more positions of the one or more UE/RAN nodes and a position of the ambient device.

23. The non-transitory, processor-readable storage medium of claim 19, wherein the one or more UE/RAN nodes are one or more selected UE/RAN nodes, and wherein the non-transitory, processor-readable storage medium further comprises processor-readable instructions to cause one or more processors of a network entity to:

transmit one or more UE/RAN node capabilities; and receive an indication of the one or more selected UE/RAN nodes;

wherein the processor-readable instructions to cause one or more processors of a network entity to transmit the combined ambient and sensing/positioning signal configuration comprise processor-readable instructions to cause one or more processors of a network entity to transmit the combined ambient and sensing/positioning signal configuration to the one or more selected UE/RAN nodes based on the first network entity receiving the indication of the one or more selected UE/RAN nodes.

24. The non-transitory, processor-readable storage medium of claim 19, further comprising processor-readable instructions to cause one or more processors of a network entity to:

request one or more ambient device capabilities;

receive the one or more ambient device capabilities;

request a position of the ambient device;

receive the position of the ambient device; and select the one or more UE/RAN nodes based on the one or more ambient device capabilities and the location of the ambient device.

\* \* \* \* \*